United States Patent [19]
Fujii et al.

[11] Patent Number: 6,010,027
[45] Date of Patent: Jan. 4, 2000

[54] THERMALLY INSULATED SYNTHETIC RESIN CONTAINER AND THERMALLY INSULATED SYNTHETIC RESIN LID

[75] Inventors: Takafumi Fujii; Masashi Yamada; Kensuke Furuyama; Atsuhiko Tanaka; Hidefumi Kamachi, all of Tokyo, Japan

[73] Assignee: Nippon Sanso Corporation, Tokyo, Japan

[21] Appl. No.: 08/974,388

[22] Filed: Nov. 19, 1997

Related U.S. Application Data

[63] Continuation-in-part of application No. 08/810,421, Mar. 4, 1997, abandoned.

[30] Foreign Application Priority Data

Nov. 20, 1996 [JP] Japan ..................................... 8-309768

[51] Int. Cl.⁷ ..................................................... B65D 6/00
[52] U.S. Cl. ................................ 220/592.2; 220/592.27; 220/574
[58] Field of Search .................................... 220/421, 422, 220/424, 426, 427, 444, 450, 460, 469, 592.2, 592.27, 574

[56] References Cited

U.S. PATENT DOCUMENTS

| | | | |
|---|---|---|---|
| 1,549,618 | 8/1925 | Skoda | 220/426 |
| 1,956,356 | 4/1934 | Justheim | 220/469 X |
| 1,973,880 | 9/1934 | Moody | 220/424 X |
| 1,988,223 | 1/1935 | Voss | 220/469 X |
| 1,993,730 | 3/1935 | Carpenter | 220/424 X |
| 2,643,021 | 6/1953 | Freedman | 220/424 |
| 3,094,448 | 6/1963 | Cornelius | 220/444 X |
| 3,118,560 | 1/1964 | Cornelius . | |
| 3,144,160 | 8/1964 | Johnson et al. . | |
| 3,162,566 | 12/1964 | Katz | 220/460 X |
| 3,205,678 | 9/1965 | Stoner | 220/426 X |
| 4,172,152 | 10/1979 | Carlisle | 220/426 X |
| 4,560,075 | 12/1985 | Lu | 220/424 X |

FOREIGN PATENT DOCUMENTS

| | | |
|---|---|---|
| 0 667 483 A1 | 8/1995 | European Pat. Off. . |
| 0 733 330 A1 | 9/1996 | European Pat. Off. . |
| 0 734 674 A1 | 10/1996 | European Pat. Off. . |
| 0 741 989 A1 | 11/1996 | European Pat. Off. . |
| 07 101 475 | 4/1995 | Japan . |
| 08 265 175 | 3/1997 | Japan . |
| 865 391 | 4/1961 | United Kingdom . |

*Primary Examiner*—Steven Pollard
*Attorney, Agent, or Firm*—Darby & Darby

[57] ABSTRACT

A thermally insulated synthetic resin container formed by providing, within a space formed in between an inner container and an outer container which are joined as a single body and forms a double walled synthetic resin container, a thermally insulating synthetic resin layer having a double wall structure, which has gas having low thermal conductivity having a thermal conductivity lower than that of air, filled between the two walls; and said thermally insulated synthetic resin container which comprises a thermally insulating layer supporting means for securing to said double walled container said thermally insulating layer provided in the space within said double walled container, thereby preventing the rattling of said thermally insulating layer, eliminates the need for forming the metal plating film, and has superior thermally insulating capabilities and durability, and manufacturing thereof is easy and inexpensive, recycling of the synthetic resin is easy, the rattling noise produced when consumers use the containers or lids is eliminated, and the discrepancies in the index times are lost, thereby improving production management and quality control.

15 Claims, 12 Drawing Sheets

THERMALLY INSULATED SYNTHETIC RESIN CONTAINER AND THERMALLY INSULATED SYNTHETIC RESIN LID

RELATED APPLICATION

This application is a Continuation-in-part application of Ser. No. 08/810,421 filed Mar. 4, 1997, now abandoned which is owned by the same assignee.

BACKGROUND OF THE INVENTION

1. Technical Field of the Invention

The present invention relates to a thermally insulated synthetic resin container and a thermally insulated synthetic resin lid which are used for thermos bottles, cooler boxes, ice boxes, thermally insulated cups, thermally insulated lunch boxes and such. More specifically, the present invention relates to a thermally insulated synthetic resin container and a thermally insulated synthetic resin lid which aim to secure the thermally insulating layer body or the thermally insulating layer body of the lid, possessing a double wall structure which encloses a thermally insulating layer filled with gas having low thermal conductivity, within the open layer of the inner and outer containers or the upper and lower surface walls of the lid, and which aim to prevent the rattling of the thermally insulating layer and the thermally insulating layer of the lid.

This application is based on patent application No. Hei 8-309768 filed in Japan; the content of which is incorporated herein by reference.

2. Description of the Related Art

A thermally insulated container, having an inner container and an outer container which are formed with synthetic resin material, with this inner container placed within the outer container while providing a space portion in between, and filling inside this space portion, at least one type of gas from among xenon, krypton, and argon, has been proposed heretofore as a thermally insulated synthetic resin container.

This type of thermally insulated synthetic resin container has provided a metal plating film on the outer surface of the inner container and the inner surface of the outer container in order to improve the gas barrier properties.

As for the forming of this type of metal plating film, in the case where resin which allows the direct application of the metal plating is used, there is a need to provide masking on the inner surface of the inner container and the outer surface of the outer container as well as the joining surface of the inner and outer containers in order to prevent the adhesion of the metal plating. This type of masking requires high precision in positioning and such, and the cost of masking, as well as that of electroplating and such performed after masking, are high. In addition, the masking process produced containers which are defective in appearance due to the metal plating film adhering to locations where the masking coating was missing or where the masking coating was accidentally stripped, and also required safety management of the masking coating as well as management to ensure the secure adhesion of the masking coating to the resin. Consequently, the masking process has an impact on the cost, the freedom of design, and durability of the container.

In the case where resin which does not allow the direct application of the metal plating is used, there is a need for an initial production process which involves the application of ABS coating or such in order to form the metal plating film. And this additional process is one of the main cause of the increase in cost.

Additionally, when strengthening the adherence of the metal plating film, there is a disadvantage of having the number of usable resins being limited and sacrificing such properties as rigidity and alkali resistance of the synthetic resin.

In addition, the formation of the metal plating film makes impossible the recovery of the synthetic resin when recycling during the manufacturing process or the disposing process, thereby increasing the cost of the container in the long run.

Furthermore, there are problems with the thermally insulated containers when synthetic resin materials having good gas barrier properties are used. Most of those resins have good hygroscopic properties, and when those resins absorb moisture, then their gas barrier properties deteriorates. Consequently, problems such as not being able to obtain desired properties exist. In addition, there are such disadvantages where the mechanical strength is lacking in certain types of resins or where the mechanical strength of a synthetic resin having good hygroscopic properties decreases due to the absorption of moisture.

SUMMARY OF THE INVENTION

The present invention proposes to offer a thermally insulated synthetic resin container and a thermally insulated synthetic resin lid which render unnecessary the formation of the metal plating film, have good thermally insulating capabilities, are superior in durability, and are easy and inexpensive to manufacture, and the synthetic resin of which is easy to recycle.

Further, the present invention also has the objective of eliminating the source of the rattling noise during the use of the container or lid by a consumer, eliminating the discrepancies in the uniformity of the production interval index times, and improving production management and quality control.

The thermally insulated synthetic resin container of the present invention is a thermally insulated synthetic resin container formed by providing, within a space formed in between an inner container and an outer container which are joined as a single body and forms a double walled synthetic resin container, a thermally insulating synthetic resin layer having a double wall structure, which has gas having low thermal conductivity having a thermal conductivity lower than that of air, filled between the two walls and comprises a thermally insulating layer supporting means for securing to the double walled container the thermally insulating layer provided in the space within the double walled container, thereby preventing the rattling of the thermally insulating layer.

The thermally insulated synthetic resin lid of the present invention is a thermally insulated synthetic resin lid formed by providing, within a space formed in between a top surface wall and a bottom surface wall which are joined as a single body and forms a double walled synthetic resin lid, a thermally insulating synthetic resin layer having a double wall structure, which has gas having low thermal conductivity having a thermal conductivity lower than that of air, filled between the two walls and comprises a thermally insulating layer supporting means of the lid for securing to the double walled lid the thermally insulating layer of the lid provided in the space within the double walled lid, thereby preventing the rattling of the thermally insulating layer of the lid.

The above thermally insulating layer supporting means and the thermally insulating layer supporting means of the lid are provided with the objective to prevent the rattling of the thermally insulating layer body and the thermally insulating layer body of the lid, to eliminate the source of the rattling noise during the use of the container or lid by a consumer, to eliminate the discrepancies in the uniformity of the production interval index times so as to make possible the visual verification of the positioning of the outer container and the top surface wall of the thermally insulating layer body and the thermally insulating layer body of the lid, and to improve production management and quality control.

With regard to the thermally insulated synthetic resin container of the present invention, the thermally insulating layer supporting means may comprise a flat surface portion provided to contact both the outer surface of the bottom portion of the thermally insulating layer body and the inner surface of the bottom portion of the outer container. Further, with regard to the thermally insulated synthetic resin lid of the present invention, the thermally insulating layer supporting means of the lid may comprise a flat surface portion provided to contact both the outer surface of the bottom portion of the thermally insulating layer body of the lid and the inner surface of the bottom portion of the bottom surface wall.

With regard to the thermally insulated synthetic resin container of the present invention, the thermally insulating layer supporting means may comprise a flat surface portion provided on one of the opposing surfaces of the outer surface of the bottom portion of the thermally insulating layer body or the inner surface of the bottom portion of the outer container, and a protrusion to contact the above flat surface portion provided on the other opposing surface. Further, with regard to the thermally insulated synthetic resin lid of the present invention, the thermally insulating layer supporting means of the lid may comprise a flat surface portion provided on one of the opposing surfaces of the outer surface of the bottom portion of the thermally insulating layer body of the lid or the inner surface of the bottom portion of the bottom surface wall, and a protrusion to contact the above flat surface portion provided on the other opposing surface.

With regard to the thermally insulated synthetic resin container of the present invention, the thermally insulating layer supporting means may comprise a vertical portion or an inclining portion, the radius of which gradually decreases in the upward direction, provided on either the bottom surface or side surface portion of the thermally insulating layer body and on either the bottom surface or side surface portion on the inner side of the outer container. Further, with regard to the thermally insulated synthetic resin lid of the present invention, the thermally insulating layer supporting means of the lid may comprise a vertical portion or an inclining portion, the radius of which increases in the upward direction, provided on either the bottom surface or side surface portion of the thermally insulating layer body of the lid and on either the bottom surface or side surface portion on the inner side of the bottom surface wall.

With regard to the thermally insulated synthetic resin container of the present invention, the thermally insulating layer supporting means may comprise a protrusion provided on either the bottom portion or the corner portion of the outer surface of the inner container, with the protruding amount of the protrusion defined so that the protrusion contacts the thermally insulating layer body when the thermally insulating layer body is in between the inner and outer containers with the inner and outer containers joined to each other at the end portions thereof, and defined so that the amount of deformation of the contacting portion falls in the range of the elastic deformation. Further, with regard to the thermally insulated synthetic resin lid of the present invention, the thermally insulating layer supporting means of the lid may comprise a protrusion provided on either the bottom portion or the corner portion of the outer surface of the top surface wall, with the protruding amount of the protrusion defined so that the protrusion contacts the thermally insulating layer body of the lid when the thermally insulating layer body of the lid is in between the top and bottom surface walls with the top and bottom surface walls joined to each other at the end portions thereof, and defined so that the amount of deformation of the contacting portion falls in the range of the elastic deformation.

With regard to the thermally insulated synthetic resin container of the present invention, the thermally insulating layer supporting means may comprise an elastic body disposed in between the double wall container and the thermally insulating layer body. Further, with regard to the thermally insulated synthetic resin lid of the present invention, the thermally insulating layer supporting means of the lid may comprise an elastic body disposed in between the double wall lid and the thermally insulating layer body of the lid.

Since the thermally insulated container of the present invention retains, within the space formed in between the inner container made of synthetic resin and the outer container made of synthetic resin which are joined to unitarily form a double walled container, the thermally insulating layer body made of synthetic resin which comprises a gas filled layer filled with gas having low thermal conductivity, the thermally insulating layer body is protected by the inner and outer containers, thereby maintaining the thermally insulating capabilities over a long period of time.

Additionally, since the thermally insulated lid of the present invention retains, within the space formed in between the top surface wall made of synthetic resin and the bottom surface wall made of synthetic resin which are joined to unitarily form a double walled lid, the thermally insulating layer body of the lid made of synthetic resin which comprises a gas filled layer filled with gas having low thermal conductivity, the thermally insulating layer body of the lid is protected by the top and bottom surface walls, thereby maintaining the thermally insulating capabilities over a long period of time.

In addition, since a metal plating film is not formed on the thermally insulated container and the thermally insulated lid of the present invention, the manufacturing cost of the thermally insulated container and the thermally insulated lid can be reduced, the recovering of the synthetic resin used in the manufacture of the thermally insulated container and the thermally insulated lid or the metallic foil used to reduce the thermal radiation heat transfer is easy, and the recycling of resources is favorable. Additionally, by filling the thermally insulating layer of the thermally insulating layer body or the thermally insulating layer body of the lid with gas having low thermal conductivity, the thickness of the thermally insulating layer can be made thin. Therefore, as a result, the thermally insulated container and the thermally insulated lid can be made thin.

In addition, the present invention offers a thermally insulated synthetic resin container and a thermally insulated synthetic resin lid which have a thermally insulating layer body of the inner portion of the container and a thermally insulating layer body of the lid of the inner portion of the lid that do not rattle during normal use, and thus do not impart any feeling of unpleasantness or uneasiness, and since there is no need for any special structure with respect to the design of the mold, the manufacturing cost can be reduced. Consequently, offered are a thermally insulated synthetic resin container and a thermally insulated synthetic resin lid which are inexpensive and easy to handle.

DETAILED DESCRIPTION OF THE PREFERRED EMBODIMENTS OF THE INVENTION

Figure 1:
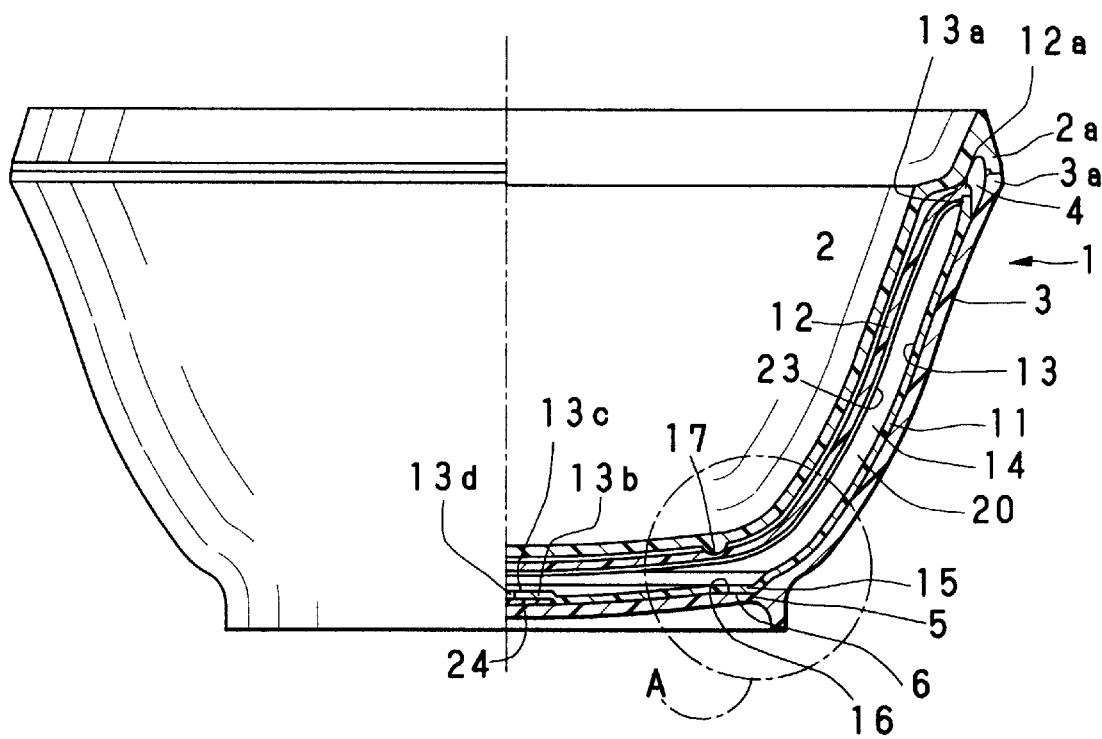
FIG. 1 is a cross sectional diagram illustrating the first embodiment of a thermally insulated synthetic resin container of the present invention.

In the thermally insulated synthetic resin container (hereinafter, referred to as thermally insulated container) and the thermally insulated synthetic resin lid (hereinafter, referred to as thermally insulated lid) of the present invention, a thermally insulating layer body and a thermally insulating layer body of the lid are disposed, and a thermally insulating layer body supporting means and a thermally insulating layer body supporting means of the lid which prevent the rattling of thermally insulating layer body and the thermally insulating layer body of the lid. The reasons for providing the thermally insulating layer body supporting means and the thermally insulating layer body supporting means of the lid in the thermally insulated container and the thermally insulated lid of the present invention are explained below.

With regard to the container having a quadruple wall structure disposing a thermally insulating layer body within the space layer between the inner and outer containers, and the lid having a quadruple wall structure disposing a thermally insulating layer body of the lid within the space layer between the top and bottom surface walls, the applicants the discover that when a rattle preventing measure is not taken, the thermally insulating layer body rattles within the space layer of the inner and outer containers and the top and bottom surface walls. That is, when a rattle preventing measure is not taken, because the thermally insulating layer body moves within the space layer and produces noise when a consumer shakes the container or lid during its wash or its actual use, the consumer may believe that the container or lid is broken or the consumer may feel uneasy believing that it may be defective. Especially in the case where the container or lid is accidentally dropped, the consumer will not be capable of judging whether the container or lid is in normal working order, and there may be a possibility that the consumer will stop using the container or lid.

If a rattle preventing measure is applied to the thermally insulating layer body, for example applying double sided tape on the outer surface of the thermally insulating layer body, securing by adhering the thermally insulating layer body to the space layer side of the inner and outer containers or the top and bottom surface walls, and preventing the thermally insulating layer body or the thermally insulating layer body of the lid from rattling, it would be difficult to have the thermally insulating layer body or the thermally insulating layer body of the lid secured with the double sided tape over a long period of time, and there may be a possibility that the thermally insulating layer body or the thermally insulating layer body of the lid will separate from the double sided tape during normal use. In such a case, there may be a possibility that the consumer will not be capable of judging whether the container or lid is in normal working order, and thus may stop its use.

In addition, the manufacturing process is also influenced when a rattle preventing measure is not taken for the thermally insulating layer body or the thermally insulating layer body of the lid. For example, when the placement position of the thermally insulating layer body is not determined with respect to the outer container or when the placement position of the thermally insulating layer body of the lid is not determined with respect to the top surface wall, it is difficult to verify by sight whether they are correctly positioned, thus producing differences in the uniformity of the production interval index times during the manufacturing process or producing discrepancies in the uniformity of the production interval index times even with the same operator. Consequently, not only is production management difficult, but there is a possibility that quality control will be negatively influenced.

Also, the applicants have discovered that the problems described below arise when the clearances between the thermally insulating layer body and the inner and outer containers are made small or even for the lid when the clearances between the thermally insulating layer body of the lid and the upper and lower walls are made small in order to secure the thermally insulating layer body from rattling.

(1) There are cases where the outer diameter of the thermally insulating layer body becomes larger than the inner diameter of the outer container and cases, even for the lid, where the outer diameter of the thermally insulating layer body of the lid becomes larger than the inner diameter of the top surface wall, due to the molded parts not being able to absorb the discrepancies in the contractions of the resin after molding due to climatic variations or the manufacturing lots of the synthetic resin. As a result, in such cases, the thermally insulating layer body or the thermally insulating layer body of the lid cannot be disposed within the inner and outer containers or the top and bottom surface walls.

(2) In the case where the thermally insulating layer body is placed in the outer container or the thermally insulating layer body of the lid is placed in the top surface wall, and the inner container is placed from above or the bottom surface wall is covered and the end portions of the inner and outer containers or the top and bottom surface walls are joined, and the end portions of the inner and outer containers or the top and bottom surface walls are vibration welded together, it would be difficult to secure the thermally insulating layer body or the thermally insulating layer body of the lid, and there is a possibility that the end portions of the inner and outer containers or the end portions of the top and bottom surface walls may be vibration welded with the joint portion of the end portions of the inner and outer containers of the thermally insulating layer body or the joint portion of the end portions of the top and bottom surface walls of the thermally insulating layer body of the lid sandwiched in between, which may cause deformations of the joint portion of the thermally insulating layer body or the thermally insulating layer body of the lid and produce cracks or fissures, thereby taking the risk of having defective thermally insulating capabilities. Additionally, although the amount of deformation will be small in the case where the strengths the thermally insulating layer body or the thermally insulating layer body of the lid are high, at the time of welding, when the thermally insulating layer body or the thermally insulating layer body of the lid is placed over the inner container or the bottom surface wall and when the end portions of the inner and outer containers or the end portions of the top and bottom surface walls are welded, an unnecessary resistance is generated above what is required to prevent rattling by the elastic deformation of the thermally insulating layer body or the thermally insulating layer body of the lid in response to the vertical force of the inner container or the bottom surface wall, and the frictional force at the time of the vibration welding becomes small. Hence, when the heat value does not reach the prescribed value, then a defective welding would result.

The thermally insulating layer body supporting means and the thermally insulating layer body supporting means for the lid according to the thermally insulated synthetic resin container and the thermally insulated synthetic resin lid of the present invention were, therefore, provided to eliminated the above problems.

The present invention will be described below with reference to the drawings.

Figure 2:
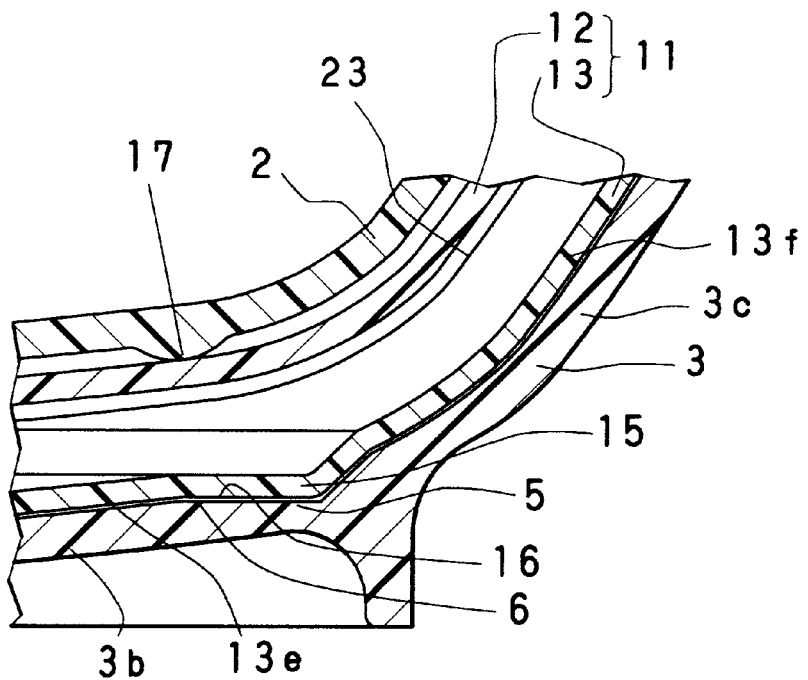
FIG. 2 is a primary portion cross sectional diagram of the thermally insulated container of FIG. 1.

FIG. 1 and FIG. 2 illustrate the first embodiment of the thermally insulated synthetic resin container of the present invention. The thermally insulated synthetic resin container 1 of the present embodiment has the form of a China bowl or a wooden bowl. This thermally insulated container 1 is formed by an inner container 2 with a cylindrical shape having a bottom surface, and a outer container 3, and a thermally insulating layer body 11 having a double wall structure provided in a space 4 between the inner and outer containers.

The thermally insulating layer body 11 is formed by an inner wall body 12 having a shape which conforms to the outer surface of the inner container 2, and an outer wall body 13 having a shape which conforms to the inner surface of the outer container 3, and gas having low thermal conductivity and having thermal conductivity which is lower than that of air is is filled in between the inner wall body 12 and the outer wall body 13. The inner wall body 12 and the outer wall body 13 are manufactured with a suitable molding means such as injection molding using synthetic resin materials.

An aperture portion 13d is formed on the bottom portion of the outer wall body 13, and in its periphery, an indented portion 13b which protrudes outward is formed in the shape of concentric circles. This indented portion 13b has the function of fitting a sealing plate 24 to seal the aperture portion 13d. A protruding portion 13c is formed in the shape of concentric circles with the aperture portion 13d as its center and is formed on the inner surface side (the thermally insulating layer side) of the outer wall body 13 to correspond to the indented portion 13b, in order to have the thickness of the outer wall body 13 in the vicinity of the center of the bottom portion be identical the other parts of the outer wall body 13. By this means, it is possible to form the thickness of the central portion of the bottom portion of the outer wall body 13 to be approximately equal to the thickness of the other parts of the outer wall body 13, thereby avoiding the loss in strength of the central portion of the bottom portion of the outer wall body 13.

The indented portion 13b is made so that the sealing plate 24 can be fitted and adhered thereto. The depth of the indented portion 13b is formed to be identical to the thickness of the sealing plate 24 which is formed by resin having identical properties as those of the inner and outer wall bodies. By means of this structure, when the thermally insulating layer body 11 is assembled, the bottom portion of the thermally insulating layer body 11 can be made flat, allowing the outer surface of the bottom portion of the thermally insulating layer body 11 to be in contact with the inner surface of the outer container 3 when the thermally insulating layer body 11 is being retained within the space 4 of the inner and outer containers 2, 3.

The aperture portion 13d is provided on the bottom portion of the outer wall body 13. With respect to the manufacturing process of the thermally insulating layer body 11, after the inner and outer wall bodies are joined together as a double wall body, the aperture portion 13d has the function as a discharge and insertion hole for exchanging the present air with gas having low thermal conductivity. And after the gas is filled, the aperture portion 13d is sealed using an adhesive agent such as a cyanoacrylate type adhesive agent. The diameter of this aperture portion 13d should preferably be made to be 0.1–3.0 mm in order to prevent the adhesive agent used in the sealing process from issuing out.

Although in the example illustrated in FIG. 1 has the indented portion 13b which is formed with the aperture portion 13d as its center, provided on the outer wall body 13, this indented portion 13b can also be provided on the inner wall body 12 instead. However, for convenience during the manufacturing process, the indented portion 13b is generally formed in the central portion of the bottom portion of the outer wall body 13.

When molding the inner wall body 12 and the outer wall body 13, synthetic resin materials which have superior gas barrier properties (hereinafter, referred to as high gas barrier resin) are chosen to be used. Specifically, the synthetic resin materials used have film permeability (ASTM D 1434-58) that is less than 1.0 g/m²/24 hr/atm with respect to $O_2$, $N_2$, and $CO_2$. Such resins include polyesters such as polyethylene terephthalate, polybutylene terephthalate, and polyethylene naphthalate, polyamide, ethylene vinylalcohol, polyvinylidene chloride, polyvinyl alcohol, and polyacrylonitrile. By forming the inner and outer wall bodies 12, 13 with the high gas barrier resins, it would be possible to have a thermally insulating layer body 11 having superior gas barrier properties without forming a metallic coating by electroplating and such on the outer surface of the inner wall body 12 and the inner surface of the outer wall body 13.

A radiation preventing material 23 is disposed on the outer surface of the inner wall body 12, in which case a radiation preventing material identical to the radiation preventing material 23 may also be disposed on the inner surface of the outer wall body 13. Aluminum foil, copper foil and metal deposition tape are favorably used, but materials such as stainless foil, silver foil, and paper which have these metallic foils attached to both sides may also be used as the radiation preventing material 23. By disposing a radiation preventing material 23, the heat transfer loss due to thermal radiation can be prevented.

The inner wall body 12 and the outer wall body 13 are joined at their respective end portions 12a, 13a by means of welding, such as vibration welding, spin welding, and heat plate welding. By use of these types of welding methods, the strength of the joint portion of the double wall body formed by the inner wall body 12 and the outer wall body 13 will be high. In addition, since excellent sealing properties are obtained, when gas having low thermal conductivity is filled in the space layer 14, there is no risk of leakage of the filled gas having low thermal conductivity.

It is desirable to use at least one type of gas from among xenon, krypton, and argon for the gas to be filled in the space flyer 14 of the thermally insulating layer body 11. The thermal conductivities of these gases are as follows: xenon ($\kappa=0.52\times10^{-2}$ W·m⁻¹·K⁻¹; 0° C.); krypton ($\kappa=0.87\times10^{-2}$ W·m⁻¹·K⁻¹; 0° C.); and argon ($\kappa=1.63\times10^{-2}$ W·m⁻¹·K⁻¹; 0° C.). They are all less than that of air ($\kappa=2.41\times10^{-2}$ W·m⁻¹·K⁻¹; 0° C.). These gases are used singly or as a mixed gas comprising of two or more types of gases, and are inserted at room temperature and at approximately atmospheric pressure or at a smaller filled pressure, that is, 80–100 kPa. These gases having low thermal conductivities are inert, and they are environmentally favorable. Additionally, by having the filled pressure with the above range, the thermally insulating capabilities of the thermally insulating layer 20 is desirable, and since the pressure difference of the thermally insulating layer 20 and the external portion is small, an indention or a swelling of the thermally insulating layer body 11 due to applied external pressures will not occur. Therefore, it is also possible for the thermally insulating layer body 11 to have a flat surface wall structure.

This thermally insulating layer body 11 is retained in the space 4 formed by the inner container 2 and the outer container 3 and by joining the end portions 2a, 3a of the inner and outer containers by means of welding such as vibration welding, spin welding, and heat plate welding, a thermally insulated container is obtained.

The inner container 2 and the outer container 3 are manufactured by injection molding using synthetic resin materials which have thermal resistance, moisture resistance (moisture permeability resistance), and mechanical strength (hereinafter, referred to as moisture resistant resins). Specifically, the moisture resistant resins used have a moisture permeability, conforming to JIS Z 0 280, which is 50 g/m²/24 hr or less at a temperature of 40° C. and at a relative humidity of 90%, and a bending elastic modulus (ASTM D790) which is greater than 10,000 kg/cm² and/or an Izod impact strength (having notch) (ASTM M D256) which is 5 kg·cm/cm or more. Such resins which include polypropylene, heat and moisture resistant polycarbonate, ABS, polystyrene, AS, polyethylene, vinyl chloride, and polyamideimide are used When the thermally insulated container 1 is assembled by having the inner and outer containers 2, 3 formed by one of the above moisture resistant resins, and by placing the thermally insulating layer body 11 in the space 4 of the inner and outer containers 2, 3, and joining the end portions of the inner and outer containers 2a, 3a by the above welding methods, the thermally insulated container 1 can be made superior in thermal resistance, moisture resistance, and mechanical strength, and can protect the thermally insulating layer body 11 formed with the high gas barrier resins.

When the thermally insulating layer body 11 is retained in the space 4 of the inner and outer containers 2, 3, and the end portions of the inner and outer containers 2a, 3a are welded together, discrepancies in the uniformity of the production interval index times generated as a result of the placement position of the thermally insulating layer body 11 not being established with respect to the outer container 3.

The present invention, therefore, forms a flat surface portion 16 on the outer surface of the peripheral portion 15 of the bottom wall portion 13e of the outer wall body 13 of the thermally insulating layer body 11, and also forms a flat surface portion 6 on the inner surface of the peripheral portion 5 of the bottom wall portion 3b of the outer container to have a planar contact with the flat surface portion 16 of the thermally insulating layer body 11.

These flat surface portions 16, 6 can be horizontal surfaces being parallel to the surface on which the thermally insulated container 1 is correctly placed or can be slightly inclined.

These flat surface portions 16, 6 is to be circumferentially formed on the peripheral portions 15, 5 in the case where the circumferential positioning of the thermally insulating layer body 11 with respect to the outer container 3 is not specified.

In the case where the circumferential positioning of the flat surface portions is specified, the flat surface portions 16, 6 of the thermally insulating layer body 11 and the outer container 3 may be formed in fixed intervals, having the circumferential length of the flat surface portions 16, 6 be approximately equal. The parts where the flat surface portions are not formed may have, in the case of the outer container 3, a protruding portion to raise the surface, and may have, in the case of the thermally insulating layer body 11, an indented portion to engage with the part having the raised surface on the outer container 3. For example, the flat surface portions may be formed on the peripheral portions 15, 5 of the bottom portion wall 13e, 3b in two locations being circumferentially shifted by 180°, or in three locations being circumferentially shifted by 120°, or in four locations being circumferentially shifted by 90°.

By forming such flat surface portions 6, 16 on the outer container 3 and the thermally insulating layer body 11, it is possible to have a definite planar contact between the flat surface portion 6 of the outer container 3 and the flat surface portion 16 of the thermally insulating layer body 11, and to determine the radial and the vertical position of the thermally insulating layer body 11 with respect to the outer container 3, and to reduce the discrepancies in the uniformity of the production interval index times of the operator. In addition, if, by means of determining the position, the vertical clearance between the outer surface of the inner wall body 12 of the thermally insulating layer body 11 and the outer surface of the inner container 2 is eliminated, it is possible to have the unit area load on the inner surface of the inner wall body 12 of the thermally insulating layer body 11 be approximately uniform when the thermally insulating layer body 11 is placed in the outer container 3 and the inner surface of the inner wall body 12 of the thermally insulating layer body 11 is covered with the outer surface of the inner container 2 and the end portions 2a, 3a of the inner and outer containers are joined by one of the above welding methods, and thus possible to prevent deformations or cracks in the thermally insulating layer body 11. Additionally, it is possible to prevent the rattling of the thermally insulating layer body 11.

Furthermore, the thickness of the periphery of the bottom wall portion 13e of the thermally insulating layer body 11 is formed to be identical to the thickness of the side wall portion 13f. In addition, the side wall portion 3c extends upward from the peripheral portion 5 of the bottom wall portion 3b of the outer container 3.

As illustrated in FIG. 2, a contact protrusion 17 on the outer surface of the inner container 2 may be formed to press against the thermally insulating layer body 11 and may also have the outer surface of the outer wall body 13 of the thermally insulating layer body 11 press against the inner surface of the outer container 3. A plurality of these contact protrusions 17 may be formed and suitably spaced on the outer surface of the inner container 2 to disperse the load on the inner surface of the inner wall body 12. In addition, they may be formed on the outer surface of the inner container 2 in the shape of annularly protruding concentric circles starting from the center of the bottom wall portion of the inner container, or in the shape of a broken string of islands, or in the shape of dots. Now, the vertical clearance between the inner container 2 and the thermally insulating layer body 11 is made small, and the radial clearance between the inner and outer containers 2, 3 and the thermally insulating layer body 11 is made relatively large. If the height of the contact protrusions 17 are formed to be slightly larger than the vertical clearance between the inner container 2 and the thermally insulating layer body 11, it is possible to have the vertical and radial deformations of the thermally insulating layer body 11 due to the , pressure of the contact protrusions 17 be contained within the range of elastic deformation, and it is possible to have the radial deformation absorb the vertical deformation of the thermally insulating layer body 11. By this means, no cracks or deformations will be caused on the thermally insulating layer body 11, and the rattling of the thermally insulating layer body 11 can be suppressed. Additionally, in the case where the contact protrusions 17 are provided, since the inner surface of the inner wall body 12 of the thermally insulating layer body 11 does not come into contact with the outer surface of the inner container 2, the thermal conduction from the inner container 2 to the inner wall body 12 can be suppressed, thereby improving the temperature maintaining capabilities.

Figure 3:
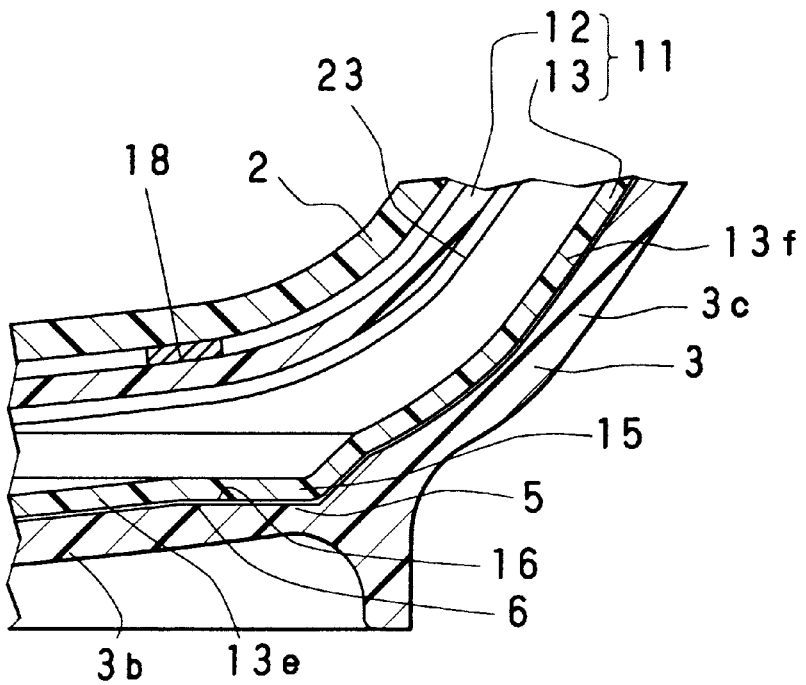
FIG. 3 is a primary portion cross sectional diagram illustrating a modified example of the thermally insulated container according to the first embodiment.

FIG. 3 illustrates a modified example of the above first embodiment of the thermally insulated container. This example disposes an elastic body 18 made of silicon type rubber, urethane type rubber, and such in between the inner container 2 and the thermally insulating layer body 11, instead of the contact protrusion 17. By disposing in between the space formed by the inner container 2 and the thermally insulating layer body 11, one or more of these elastic bodies 18 having a thickness greater than the above space, it is possible to suppress the rattling of the thermally insulating layer body 11 within the space 4. The elastic body 18 is suitable for preventing the rattling of the thermally insulating layer body 11, because it elastically deform:s between the inner container 2 and the inner wall body 12, because it has frictional force.

Figure 4:
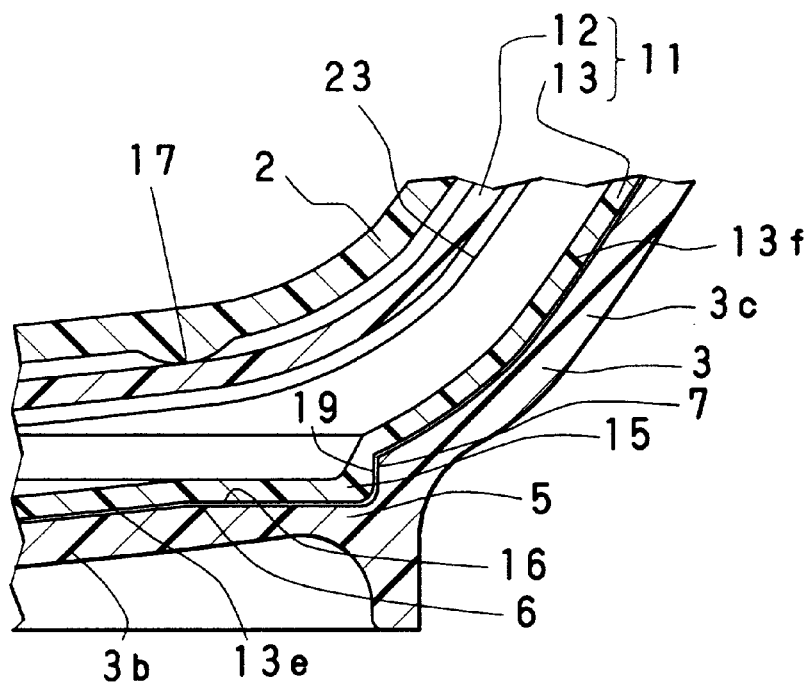
FIG. 4 is a primary portion cross sectional diagram illustrating the second embodiment of a thermally insulated synthetic resin container of the present invention.

FIG. 4 illustrates the second embodiment of the thermally insulated synthetic resin container of the present invention. This embodiment provides an outer wall body vertical portion 19 on the outer surface of the bottom portion of the side wall portion 13f of the outer wall body 13 of the thermally insulating layer body 11, and provides an outer container vertical portion 7 on the inner surface of the bottom portion of the side wall portion 3c of the outer container 3, and is structured so as to have the outer wall body vertical portion 19 engage with the outer container vertical portion 7.

A flat surface portion 16 is formed on the outer surface of the peripheral portion 15 of the bottom wall portion 13e of the outer wall body 13, and a flat surface portion 6 is formed on the inner surface of the peripheral portion 5 of the bottom wall portion 3b of the outer container 3 to have a planar contact with the flat surface portion 16 of the thermally insulating layer body 11. These flat surface portions 16, 6 may be horizontal surfaces being parallel to the surface on which the thermally insulated container 1 is correctly placed or can be slightly inclined.

Here, the outer wall body vertical portion 19 is circumferentially formed on the bottom portion of the side wall portion, and its outer diameter is slightly less than the inner diameter of the outer container vertical portion 7. By this means, ashen the outer container 3 is places in the thermally insulating layer body 11, the outer wall body vertical portion 19 can engage with the outer container vertical portion 7, thereby allowing the radial positioning of the thermally insulating layer body 11 with respect to the outer container 3. In addition, since it is possible to have a definite planar contact between the flat surface portion 16 of the thermally insulating layer body 11 and the flat surface portion 6 of the outer container 3, it is possible to determine the vertical positioning of the thermally insulating layer body 11 with respect to the outer container 3. Furthermore, when placing the thermally insulating layer body 11 in the outer container 3, if the outer wall body vertical portion 19 of the thermally insulating layer body 11 is not engaged with the outer container vertical portion 7 of the outer container 3, an operator can visually determine that the thermally insulating layer body 11 is tilted with respect to the outer container 3, thereby preventing any problems of housing the thermally insulating layer body 11 within the outer container 3 in a tilted position.

A plurality of contact protrusions 17 are formed and suitably spaced on the outer surface of the inner container 2 to press against the thermally insulating layer body 11 and may also have the outer surface of the outer wall body 13 of the thermally insulating layer body 11 press against the inner surface of the outer container 3. They may also be formed on the outer surface of the inner container 2 in the shape of annularly protruding concentric circles starting from the center of the bottom wall portion of the inner container, or in the shape of a broken string of islands, or in the shape of annular ribs protruding in the shape of dots.

Figure 5:
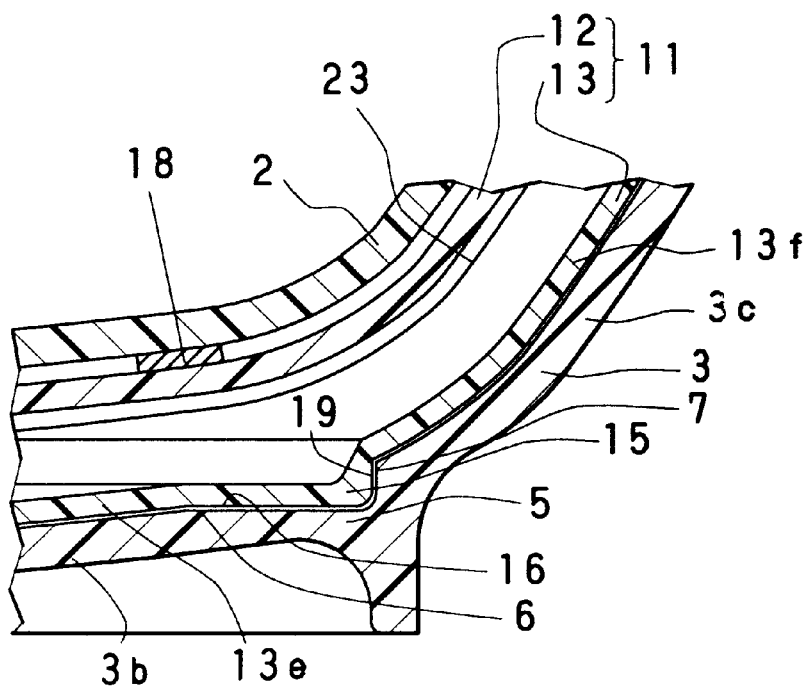
FIG. 5 is a primary portion cross sectional diagram illustrating a modified example of the thermally insulated container according to the second embodiment.

FIG. 5 illustrates a modified example of the thermally insulated container according to the above second embodiment. This example disposes an elastic body 18 made of silicon type rubber, urethane type rubber, and such in between the inner container 2 and the thermally insulating layer body 11, instead of the contact protrusion 17.

Figure 6:
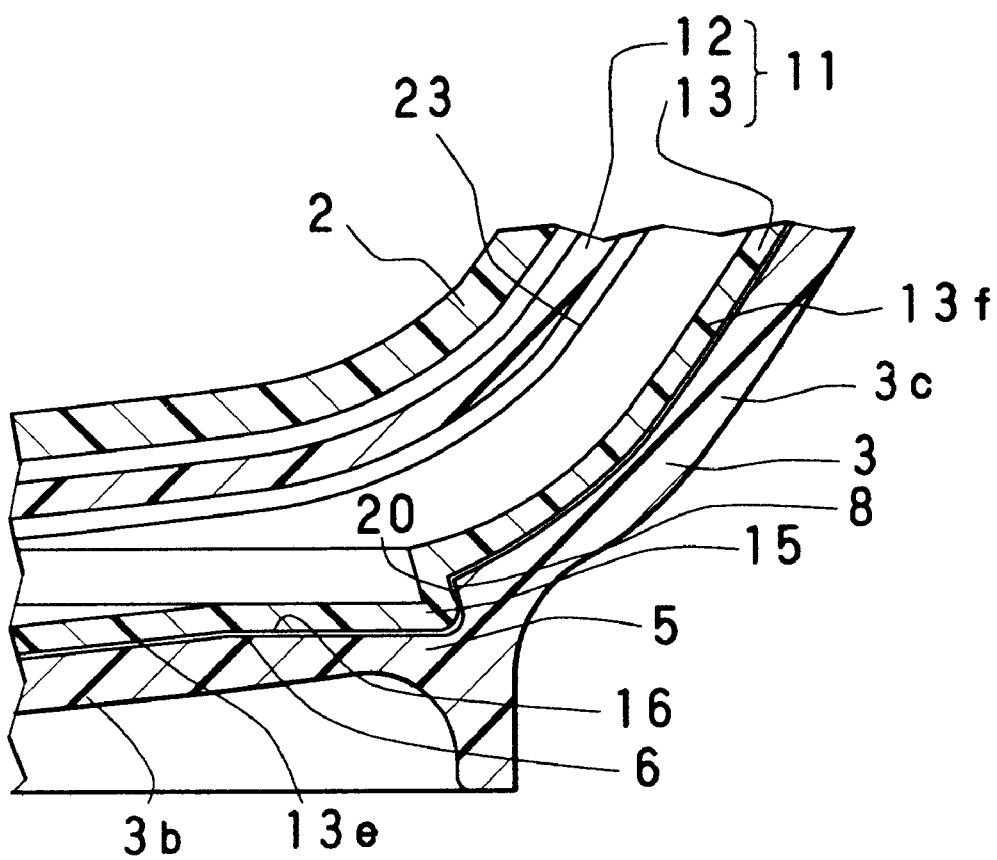
FIG. 6 is a primary portion cross sectional diagram illustrating the third embodiment of a thermally insulated synthetic resin container of the present invention.

FIG. 6 illustrates the third embodiment of the thermally insulated synthetic resin container of the present invention. This embodiment provides an outer wall body inclining portion 20, which gradually decreases the outer radius of the bottom portion of the side wall portion in the upward direction, on the outer surface of the bottom portion of the side wall portion 13f of the outer wall body 13 of the thermally insulating layer body 11, and provides an outer container inclining portion 8, which gradually decreases the inner diameter of the bottom portion of the side wall portion 3c in the upward direction, on the inner surface of the bottom portion of the side wall portion 3c of the outer container 3, and is structured so as to have the outer wall body inclining portion 20 coercively engage with the outer container inclining portion 8.

A flat surface portion 16 is formed on the outer surface of the peripheral portion 15 of the bottom wall portion 13e of the outer wall body 13, and a flat surface portion 6 is formed on the inner surface of the peripheral portion 5 of the bottom wall portion 3b of the outer container 3 to have a planar contact with the flat surface portion 16 of the thermally insulating layer body 11. These flat surface portions 16, 6 may be horizontal surfaces being parallel to the surface on which the thermally insulated container 1 is correctly placed or can be slightly inclined.

The outer diameter of the top end of the outer wall body inclining portion 20 provided on the thermally insulating layer body 11 is formed to be slightly less than the outer diameter of the bottom end of the outer wall body inclining portion 20, while the inner diameter of the top end of the outer container inclining portion 8 is formed to be slightly less than the inner diameter of the bottom end of the outer container inclining portion 8. In addition, the outer diameter of the top end of the outer wall body inclining portion 20 is formed to be approximately equal or slightly greater than the inner diameter of the top end of the outer container inclining portion 8.

By this means, when the thermally insulating layer body 11 is placed in the outer container 3, it is possible to have the outer wall body inclining portion 20 of the outer wall body 13 be coercively engaged with the outer container inclining portion 8. In addition, it is possible to have a definite planar contact between the flat surface portion 6 of the bottom wall portion 3b of the outer container 3 and the flat surface portion 16 of the bottom wall portion 13e of the thermally insulating layer body 11, and to determine the radial and the vertical positions. Additionally, when the thermally insulating layer body 11 is placed in the outer container, if the outer wall body inclining portion 20 of the thermally insulating layer body 11 is not engaged with the outer container inclining portion 7 of the outer container 3, the tilting of the thermally insulating layer body 11 can be visually detected, thereby allowing the thermally insulating layer body 11 to be housed in the outer container more accurately. In this case, a plurality of contact protrusions 17 may be formed and suitably spaced on the outer surface of the inner container 2 and to have the outer surface of the outer wall body 13 of the thermally insulating layer body 11 press against the inner surface of the outer container 3 as employed in FIG. 2 and FIG. 4. Or they may be formed on the outer surface of the inner container 2 in the shape of annularly protruding concentric circles starting from the center of the inner container 2, or in the shape of a broken string of islands, or in the shape of dots.

In this thermally insulated container according to the third embodiment, one or more of the elastic bodies 18 made of silicon type rubber, urethane type rubber, and such may be disposed as employed in FIG. 3 and FIG. 5. By disposing these contact protrusions 17 or elastic bodies 18 as such, the rattling of the thermally insulating layer body 11 can be absolutely prevented.

Figure 7:
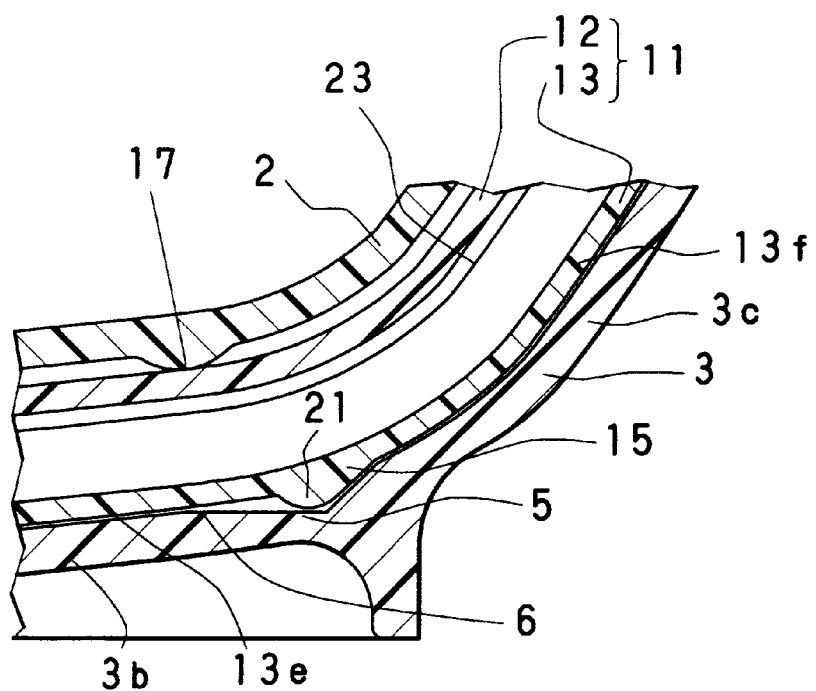
FIG. 7 is a primary portion cross sectional diagram illustrating the fourth embodiment of a thermally insulated synthetic resin container of the present invention.

FIG. 7 illustrates the fourth embodiment of the thermally insulated synthetic resin container of the present invention. This embodiment provides a flat surface portion 6 on the inner surface of the peripheral portion 5 of the bottom wall portion 3b of the outer container 3, and provides a protrusion 21, which contacts the flat surface portion 6, on the outer surface of the peripheral portion 15 of the bottom wall portion 13c of the outer wall body 13 of the thermally insulating layer body 11. The flat surface portion 6 may be a horizontal surface being parallel to the surface on which the thermally insulated container 1 is correctly placed or can be slightly inclined.

The protrusion 21 is formed to contact the flat surface portion 6 of the outer container 3, and to also engage with the bottom portion of the side wall portion 3c. In addition, a plurality of these protrusions 21 may be formed, in the shape of concentric circles from the center of the bottom wall portion 13c, on the outer surface of the peripheral portion 15 of the bottom wall portion 13e provided on the outer wall body 13 of the thermally insulating layer body 11, or they may be formed in the shape of concentric annular ribs. By forming the protrusions 21 as such, it is possible to determine the radial position of the thermally insulating layer body 11 with respect to the outer container 3. In addition, if the thermally insulating layer body 11 and the inner container 2 are formed so as to eliminate the vertical clearance between the thermally insulating layer body 11 and the inner container 2, the inner container 2 can uniformly press against the thermally insulating layer body 11, and it would be possible to prevent the rattling of the thermally insulating layer body 11 by means of the vertical pressure of the inner container on the thermally insulating layer body 11.

A plurality of contact protrusions 17 may be formed and suitably spaced on the outer surface of the inner container 2 to press against the thermally insulating layer body 11 and may also have the outer surface of the outer wall body of the thermally insulating layer body 11 press against the inner surface of the outer container 3. Or they may be formed on the outer surface of the inner container 2 in the shape of annularly protruding concentric circles starting from the center of the bottom wall portion of the inner container, or in the shape of a broken string of islands, or in the shape of dots.

Figure 8:
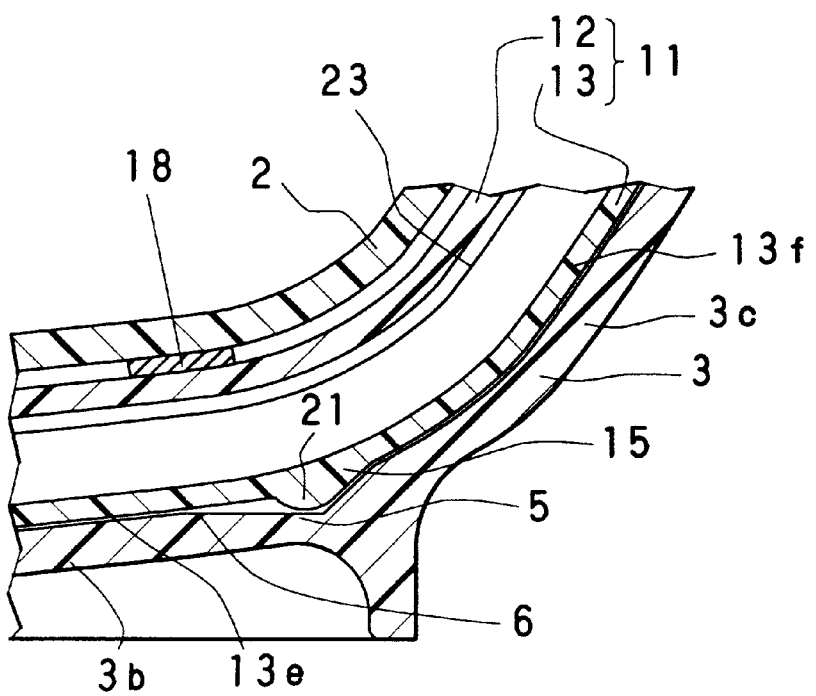
FIG. 8 is a primary portion cross sectional diagram illustrating a modified example of the thermally insulated container according to the fourth embodiment.

FIG. 8 illustrates a modified example of the thermally insulated container according to the above fourth embodiment. This example disposes an elastic body 18 made of silicon type rubber, urethane type rubber, and such in between the inner container 2 and the thermally insulating layer body 11, instead of the contact protrusion 17. By the forming of the contact protrusions 17 or by the disposing of the elastic bodies 18, it is possible to prevent the rattling of the thermally insulating layer body 11 more effectively.

Figure 9:
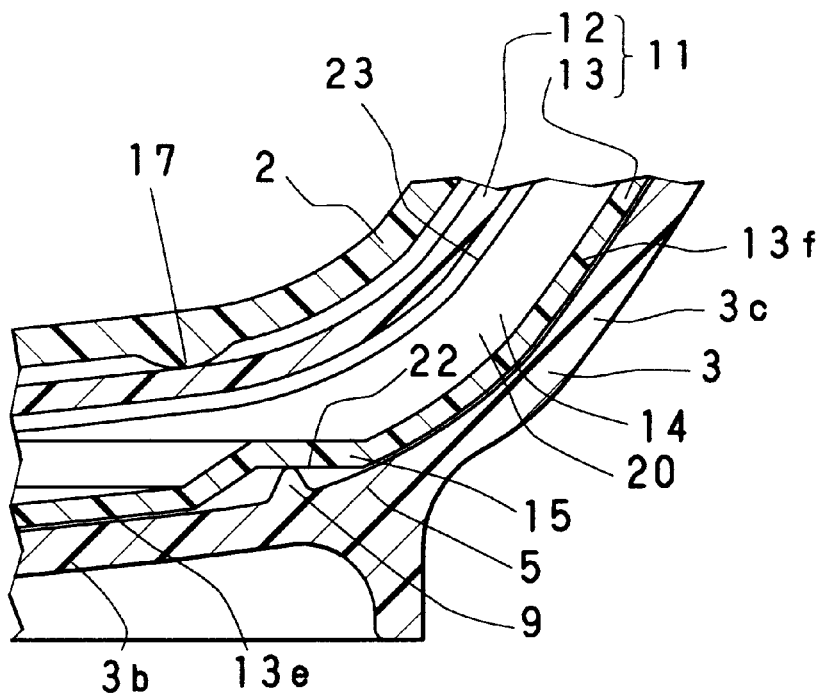
FIG. 9 is a primary portion cross sectional diagram illustrating the fifth embodiment of a thermally insulated synthetic resin container of the present invention.

FIG. 9 illustrates the fifth embodiment of the thermally insulated synthetic resin container of the present invention. This embodiment provides a flat surface portion 22 on the outer surface of the peripheral portion 15 of the bottom wall portion 13e provided on the outer wall body 13 of the thermally insulating layer body 11, and provides a protrusion 9, which contacts the flat surface portion 22, on the inner surface of the peripheral portion 5 of the bottom wall portion 3b of the outer container 3.

A plurality of these protrusions 9 may be formed, in the shape of concentric circles from the center of the bottom wall portion 3b, on the inner surface of the peripheral portion 5 of the bottom wall portion 3b of the outer container 3, or they may be formed in the shape of concentric annular ribs from the center of the bottom wall portion 3b. By forming the protrusions 9 as such, it is possible to determine the radial position of the thermally insulating layer body 11 with respect to the outer container 3, and to check the tilting of the thermally insulating layer body. In addition, if the thermally insulating layer body 11 and the inner container 2 are formed so as to eliminate the vertical clearance between the thermally insulating layer body 11 and the inner container 2, the inner container 2 can uniformly press against the thermally insulating layer body 11, and it would be possible to prevent the rattling of the thermally insulating layer body 11 by means of the vertical pressure of the inner container on the thermally insulating layer body 11. The thickness of the peripheral portion 15 of the bottom wall portion 13e of the outer wall body 13 possessing the flat surface portion 22 of the thermally insulating layer body 11 is formed to be identical to the thickness of the bottom wall portion 13c or the thickness of the side wall portion 13f.

When the thermally insulating layer body 11 is housed in the outer container 3, if the flat surface portion 22 of the thermally insulating layer body 11 is not in contact with the protrusion of the outer container 3, an operator can visually determine that the thermally insulating layer body 11 is tilted, thereby allowing the radial and the vertical positioning of the thermally insulating layer body 11 with respect to the outer container lore accurately.

The contact protrusion 17 may be formed on the outer surface of the inner container 2 to press against the thermally insulating layer body 11 and may also have the outer surface of the outer wall body 13 of the thermally insulating layer body 11 contact against the inner surface of the outer container 3.

Figure 10:
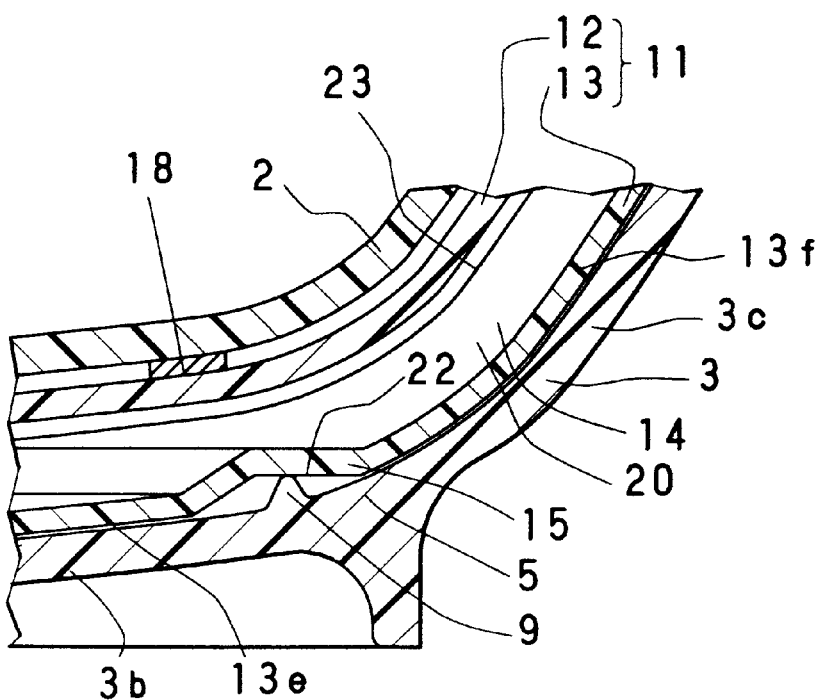
FIG. 10 is a primary portion cross sectional diagram illustrating a modified example of the thermally insulated container according to the fifth embodiment.

FIG. 10 illustrates a modified example of the thermally insulated container according to the above fifth embodiment. This example disposes an elastic body 18 made of silicon type rubber, urethane type rubber, and such in between the inner container 2 and the thermally insulating layer body 11, instead of the contact protrusion 17.

Figure 11:
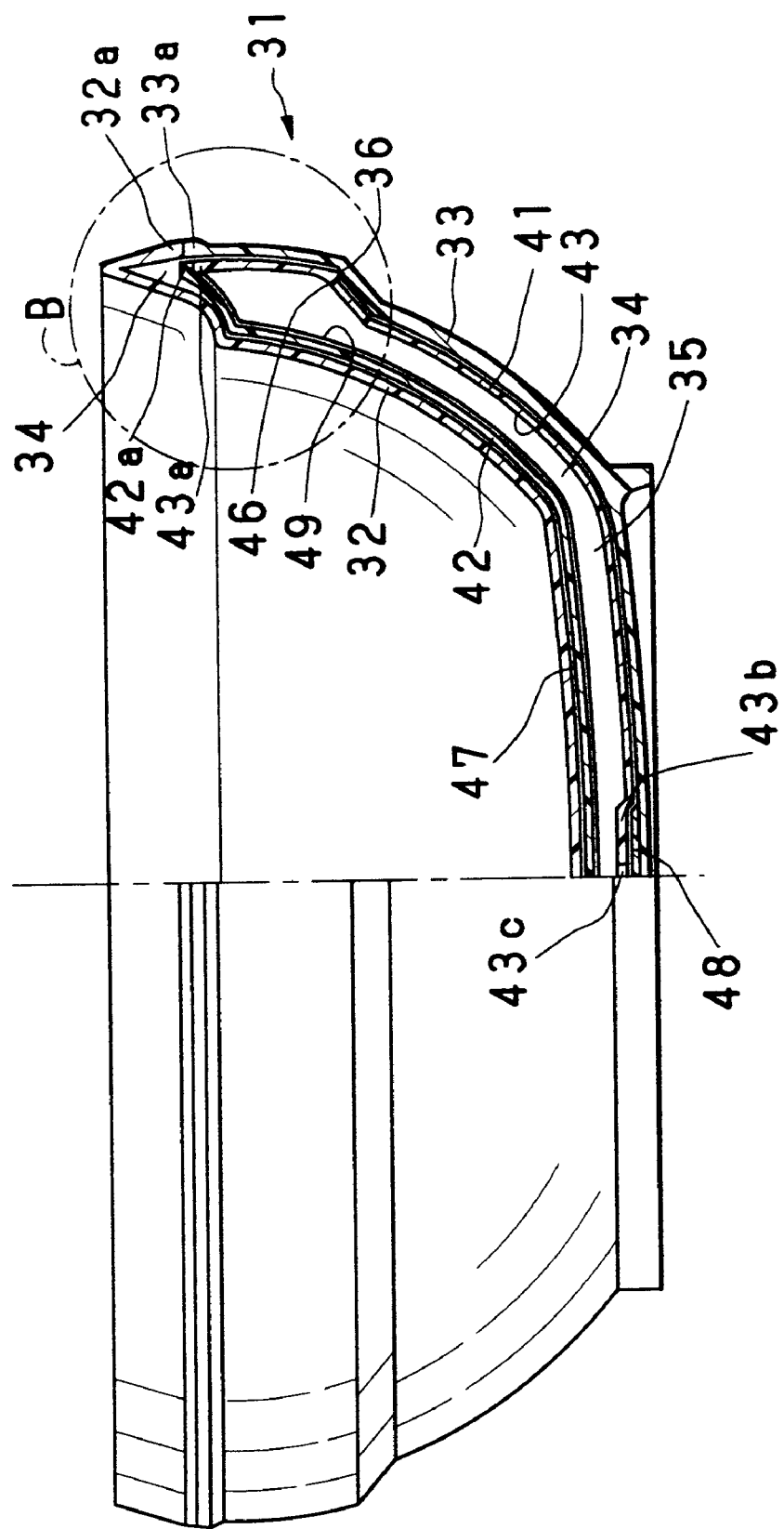
FIG. 11 is a cross sectional diagram illustrating the sixth embodiment of a thermally insulated synthetic resin container of the present invention.
Figure 12:
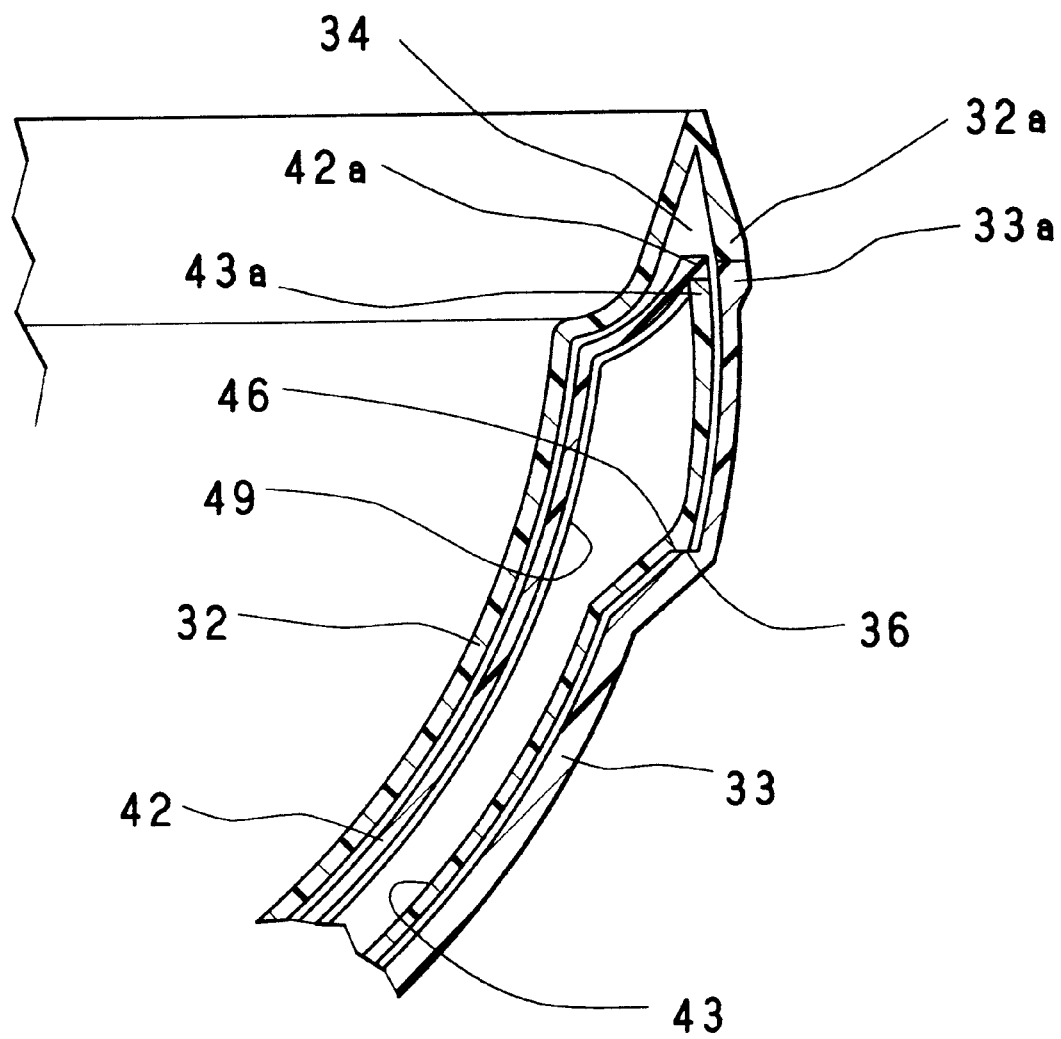
FIG. 12 is a primary portion cross sectional diagram illustrating the same thermally insulated container of the sixth embodiment.

FIG. 11 and FIG. 12 illustrate the sixth embodiment of the thermally insulated synthetic resin container of the present invention. The thermally insulated container 31 according to this embodiment has, as in the thermally insulated container according to the first embodiment, an inner container 32 and an outer container 33 which comprises synthetic resin materials, especially moisture resistant resins, and which, while providing a space in between, are joined at their respective end portions 32a, 33a and made into a single body. This thermally insulated container 31 disposes in between the inner and outer containers 32, 33 a thermally insulating layer body 41 having an inner wall body 42 and an outer wall body 43 which comprises synthetic resin materials, especially high gas barrier resins, and which, while providing a space layer 34 in between, are joined at their respective end portions 42a, 43a and made into a single body. In addition, a thermally insulating layer 35 is formed by filling in the space between the inner and outer containers 42, 43 of the above thermally insulating layer body 41 with at least one type of gas having low thermal conductivity chosen from the group consisting xenon, krypton, and argon. An indented portion 43b, which is indented on the thermally insulating layer side for fitting a sealing plate 48, is formed on the bottom portion of the outer wall body 43, and an aperture 43c having a diameter of 0.1–3.0 mm is created in the center portion of the above indented portion 43b. This aperture 43c is fitted within the indented portion 43b, and is completely sealed by the sealing plate 48 adhered with a cyanoacrylate type adhesive agent. Furthermore, a radiation preventing material 49 comprising aluminum foil, copper foil, and such is disposed on the inner surface side of the inner wall body 42 of the thermally insulating layer body 41.

This thermally insulated container 31 forms on the inner surface of the shoulder portion of the outer container 33, a flat surface portion 36, which protrudes on the space 34 side, and provides a flat surface portion 46 on the outer surface of the shoulder portion of the thermally insulating layer body 41 to engage with the flat surface portion 36 of the outer container 33.

In addition, the embodiment illustrated by FIG. 11 and FIG. 12 disposes an elastic body 47 made of silicon type rubber, urethane type rubber, and such in between the inner container 32 and the thermally insulating layer body 41, and has the thermally insulating layer body 41 push against the inner surface side of the outer container 33, thereby maintaining a contacted state between the flat surface portion 46 of the thermally insulating layer body 41 side and the flat surface portion 36 of the outer container 33 side.

Additionally, a protrusion identical to the contact protrusion 17 described in the above first through fifth embodiments may be formed instead of the elastic body 47.

Furthermore, a protrusion may be formed on the flat surface portion 46 or on the flat surface portion 36 for allowing horizontal positioning.

According to this embodiment, the radial and vertical positioning of the thermally insulating layer body 41 is achieved by having the flat surface portion 36 provided on the shoulder portion of the outer container 33 contact the flat surface portion 46 provided on the shoulder portion of the thermally insulating layer body 41.

If the vertical clearance between the thermally insulating layer body 41 and the inner container 32 is eliminated, the inner surface (top surface) of the inner wall body 42 of the thermally insulating layer body 41 can be pressed by the outer surface (bottom surface) of the inner container 32, thereby eliminating the rattling of the thermally insulating layer body 41.

In addition, by disposing an elastic body 47 in between the inner container 32 and the thermally insulating layer body 41 or by forming a contact protrusion on the outer surface of the inner container 32, it is possible to prevent the rattling of the thermally insulating layer body 41 more effectively.

Figure 13:
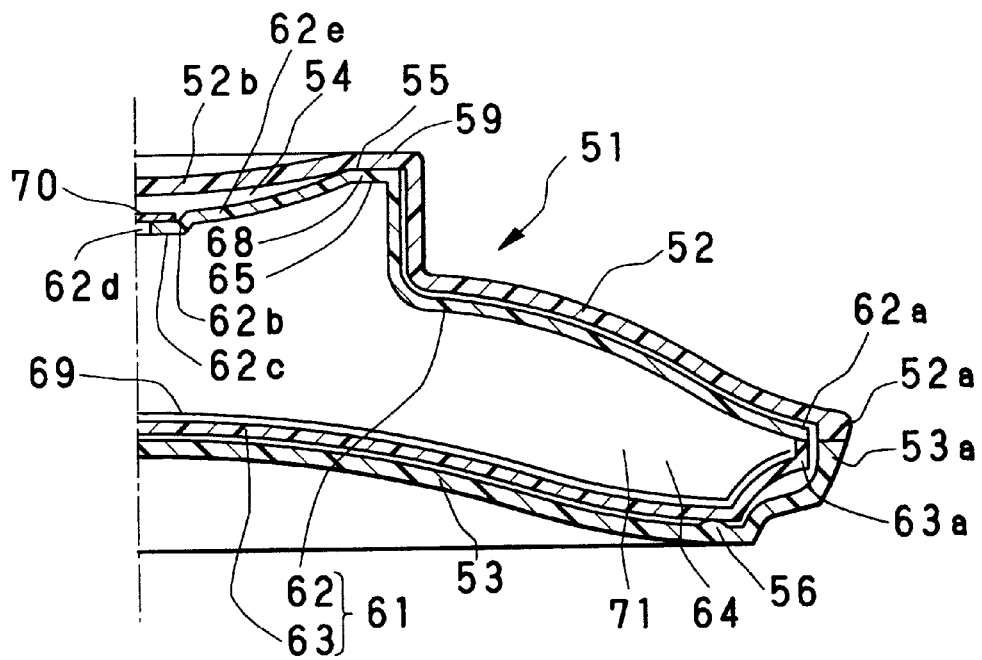
FIG. 13 is a cross sectional diagram illustrating the first embodiment of a thermally insulated synthetic resin lid of the present invention.

FIG. 13 illustrates the first embodiment of the thermally insulated synthetic resin lid of the present invention. The thermally insulated lid 51 according to this embodiment has the function of engaging with and covering the mouth portion of the thermally insulated container 1, 31 described in FIG. 1 through FIG. 12.

This thermally insulated lid 51 houses, in a space 54 formed by a bottom surface wall 53 and a top surface wall 52 possessing in the center portion a tubular protruding portion which protrudes in the upward direction, a thermally insulating layer body of the lid 61 which comprises a double wall structure, and which is filled with gas having low thermal conductivity within a space later 64 between the two walls.

This thermally insulating layer body of the lid 61 comprises a top wall body 62 having a shape which conforms to the inner surface of the top surface wall 52, and a bottom wall body 63 having a shape which conforms to the outer surface of the bottom surface wall 53. The top wall body 62 and the bottom wall body 63 are manufactured by conventionally known molding methods such as the injection molding method using synthetic resin materials.

An indented portion 62*b* to fit a sealing plate 70 is provided in the center of the canopy portion 62*e* of the top wall body 62, and an aperture 62*d* is formed in the center of the indented portion 62*b*. The indented portion 62*b* may have a variety of shapes including a circular shape, an oval shape, and all angular shape, but a circular shape is preferred. And the shape of the sealing plate 70 is identical to the indented portion 62*b*. The thickness of the part of the indented portion 62*b* is approximately equal to the thickness of the other parts of the top wall body 62 in order to maintain the identical mechanical strength as that of the other parts. The sealing plate 70 to be fitted and adhered to the indented portion 62*b* is formed with the same resins used for the top and bottom wall bodies 62, 63, and its thickness is identical to the depth of the indented portion 62*b*. It is desirable to have the top surface of the canopy portion 62*e* of the thermally insulating layer body of the lid 61 be flat when the sealing plate 70 is fitted and adhered to the indented portion 62*b*.

With respect to the manufacturing process of the thermally insulating layer body of the lid 61, after the periphery of the top and bottom wall bodies 62, 63 are joined, forming a double wall structure, an aperture 62*d* is used as a discharge and insertion hole for exchanging the present air in the space between the inner and outer walls with gas having low thermal conductivity. And after the gas having low thermal conductivity is filled, the aperture 62*d* is sealed using an adhesive agent such as a cyanoacrylate type adhesive agent. The diameter of this aperture 62*d* should preferably be made to be 0.1–3.0 mm in order to prevent the adhesive agent used in the sealing process from issuing out.

When molding the top wall body 62 and the bottom wall body 63, high gas barrier resins such as polyesters including polyethylene terephthalate, polybutylene terephthalate, and polyethylene naphthalate, polyamide, ethylene vinylalcohol, polyvinylidene chloride, polyvinyl alcohol, and polyacrylonitrile are chosen to be used. By forming the top and bottom wall bodies 62, 63 with the high gas barrier resins, it would be possible to have a thermally insulating layer body 61 having superior gas barrier properties without forming a metallic coating by electroplating and such on the top surface of the bottom wall body 63 and the bottom surface of the top wall body 62.

A radiation preventing material 69 is disposed on the top surface of the bottom wall body 63, in which case a radiation preventing material identical to the radiation preventing material 69 may also be disposed on the bottom surface of the top wall body 62. Aluminum foil, copper foil and metal deposition tape are favorably used, but materials such as stainless foil, silver foil, and paper which have these metallic foils attached to both sides may also be used as the radiation preventing material 69. By disposing a radiation preventing material 69, the heat transfer loss due to thermal radiation can be prevented.

The top wall body 62 and the bottom wall body 63 are joined at their respective end portions 62*a*, 63*a* by means of welding, such as vibration welding, spin welding, and heat plate welding. By use of these types of welding methods, the strength of the joint portion of the double wall body formed by the top wall body 62 and the bottom wall body 63 will be high. In addition, since excellent sealing properties are obtained, when gas having low thermal conductivity is filled in the space layer 64, there is no risk of leakage of the filled gas having low thermal conductivity.

It is desirable to use at least one type of gas from among xenon, krypton, and argon for the gas to be filled in the space layer 64 of the thermally insulating layer body of the lid 61. These gases are used singly or as a mixed gas comprising of two or more types of gases, and are inserted at room temperature and at approximately atmospheric pressure or at a smaller filled pressure, that is, 80–100 kPa. These gases having low thermal conductivities are inert, and they are environmentally favorable. Additionally, by having the filled pressure with the above range, the thermally insulating capabilities of the thermally insulating layer 71 is desirable, and since the pressure difference of the thermally insulating layer 71 and the external portion is small, an indention or a swelling of the thermally insulating layer body of the lid 61 due to applied external pressures will not occur. Therefore, it is also possible for the thermally insulating layer body of the lid 61 to have a flat surface wall structure.

This thermally insulating layer body of the lid 61 is retained in the space 54 formed by the top surface wall 52 and the bottom surface wall 53 and by joining the end portions 62*a*, 63*a* of the top and bottom wall bodies by means of welding such as vibration welding, spin welding, and heat plate welding, a thermally insulated lid 51 is obtained.

The top surface wall 52 and the bottom surface wall 53 are manufactured by injection molding using moisture resistant resins which have thermal resistance, moisture resistance (moisture permeability resistance), and mechanical strength, for example, polypropylene, heat and moisture resistant polycarbonate, ABS, polystyrene, AS, polyethylene, vinyl chloride, and polyamideimide.

When the thermally insulated lid 51 is assembled by having the top and bottom surface walls 52, 53 formed by one of the above moisture resistant resins, and by placing the thermally insulating layer body of the lid 61 in the space 54 of the top and bottom surface walls 52, 53, and joining the end portions 52*a*, 53*a* of the top and bottom surface walls by the above welding methods, the thermally insulated lid 51 can be made superior in thermal resistance, moisture resistance, and mechanical strength, and can protect the thermally insulating layer body of the lid 61 formed with the high gas barrier resins.

When the thermally insulating layer body of the lid 51 is retained in the space 54 of the top and bottom surface walls 52, 53, and the end portions 52*a*, 53*a* thereof are welded together using a vibration welding apparatus, the top surface wall 52 is turned upside down and disposed on the bottom jig which supports the outer surface of the top surface wall 52 over almost the entire surface, the thermally insulating layer body of the lid 61 is turned upside down and placed in the inner surface of the top surface wall 52, the bottom surface of this thermally insulating layer body of the lid 61 is covered by the top surface of the bottom surface wall 53 and the end portions 52*a*, 53*a* of the top and bottom surface walls are joined, and the top jig which supports the bottom surface of the bottom surface wall 53 over almost the entire surface is pressed, vibration welding is performed by applying vibrations to the top and bottom jigs. However, because a method for the positioning of the thermally insulating layer body of the lid 61 with respect to the top surface wall 52 was not established, discrepancies in the uniformity of the production interval index times generated.

The present invention, therefore, forms a flat surface portion 55 in the vicinity of the peripheral portion of the canopy portion 52b of the top surface wall 52, and also forms a flat surface portion 65 in the vicinity of the peripheral portion 68 of the canopy portion 62e provided on the top wall body 62 of the thermally insulating layer body of the lid 61 to have a planar contact with the flat surface portion 55 of the top surface wall 52. These flat surface portions 55, 65 can be horizontal surfaces being parallel to the surface on which the thermally insulated lid 51 is correctly placed or can be slightly inclined.

These flat surface portions 55, 65 is to be circumferentially formed on the peripheral portions 59, 68 in the case where the circumferential positioning of the thermally insulating layer body of the lid 61 with respect to the top surface wall 52 is not specified.

In the case where the circumferential positioning of the flat surface portions is specified, the flat surface portions 55, 65 may be formed in fixed intervals, having their circumferential lengths be approximately equal. The parts where the flat surface portions are not formed may have, in the case of the top surface wall 52, a protruding portion to raise the surface, and may have, in the case of the top wall body 62, an indented portion to engage with the part having the raised surface on the top surface wall 52. For example, the flat surface portions may be formed on the peripheral portions 59, 68 of the canopy portions 52b, 623 in two locations being circumferentially shifted by 180°, or in three locations being circumferentially shifted by 120°, or in four locations being circumferentially shifted by 90°.

By forming such flat surface portions 55, 65 on the canopy portion 52b of the top surface wall 52 and the canopy portion 62e of the thermally insulating layer body of the lid 61, it is possible to have a definite planar contact between the flat surface portion 55 of the top surface wall 52 and the flat surface portion 65 of the thermally insulating layer body of the lid 61, and to determine the radial and the vertical position of the thermally insulating layer body of the lid 61 with respect to the top surface wall 52, and to reduce the discrepancies in the uniformity of the production interval index times of the operator. In addition, if, by means of determining the position, the vertical clearance between the bottom surface of the bottom wall body 63 of the thermally insulating layer body of the lid 61 and the top surface of the bottom surface wall 53 is eliminated, it is possible to have the unit area load on the bottom surface of the bottom wall body 63 of the thermally insulating layer body of the lid 61 be approximately uniform when the thermally insulating layer body of the lid 61 is placed in the top surface wall 52 and the bottom surface of the bottom wall body 63 of the thermally insulating layer body of the lid 61 is covered with the top surface of the bottom surface wall 53 and the end portions 52a, 53a of the top and bottom surface walls are joined by one of the above welding methods, and thus possible to prevent deformations or cracks in the thermally insulating layer body of the lid 61. Additionally, it is possible to prevent the rattling of the thermally insulating layer body of the lid 61.

Furthermore, the thickness of the peripheral portion 68 of the canopy portion 62e of the top wall body 62 possessing the flat surface portion 65 of the thermally insulating layer body of the lid 61 is formed to be identical to the thickness of the canopy portion 62e other than the peripheral portion 68 or the thickness of the side wall portion. In addition, the thickness of the peripheral portion 59 of the canopy portion 52b due to the forming of the flat surface portion 55 on the canopy portion 52b of the top surface wall 52 is formed to be identical to the thickness of the canopy portion 52b other than the peripheral portion 59 or the thickness of the side wall portion.

A contact protrusion 56 may be formed on the top surface of the bottom surface wall 53 to press against the thermally insulating layer body of the lid 61 and may also have the outer surface of the top wall body 62 of the thermally insulating layer body of the lid 61 contact the inner surface of the top surface wall 52. A plurality of these contact protrusions 56 may he med and suitably spaced on the top surface of the bottom surface wall 53 and may be formed in the shape of annularly protruding concentric circles starting from the center of the bottom surface wall 53, or in the shape of a broken string of islands, or in the shape of dots. Now, the radial clearance between the top and bottom surface walls 52, 53 and the thermally insulating layer body of the lid 61 is made relatively large, and the vertical clearance between the bottom surface wall 53 and the thermally insulating layer body of the lid 61 is made small. If the height of the contact protrusions 56 are formed to be slightly larger than the vertical clearance between the bottom surface wall 53 and the thermally insulating layer body of the lid 61, it is possible to have the vertical and radial deformations of the thermally insulating layer body of the lid 61 due to the pressure of the contact protrusions 56 be contained within the range of elastic deformation, and it is possible to have the radial deformation absorb the vertical deformation of the thermally insulating layer body of the lid 61. By this means, no cracks or deformations will be caused on the thermally insulating layer body of the lid 61, and the rattling of the thermally insulating layer body of the lid 61 can be suppressed.

In the case where the contact protrusions 56 are provided, since the bottom surface of the bottom wall body 63 of the thermally insulating layer body of the lid 61 does not come into contact with the outer surface of the bottom surface wall 53, the thermal conduction from the bottom surface wall 53 to the bottom wall body 63 can be suppressed, thereby improving the temperature maintaining capabilities.

Furthermore, although FIG. 13 provides flat surface portions 55, 65 on the top surface body 62 and the top surface wall 52, and forms a contact protrusion 56 on the top surface of the bottom surface wall 53, a contact protrusion may be formed on the top surface wall 52, and flat surface portions may be provided on the bottom surface wall 53 and the bottom wall body 63.

Figure 14:
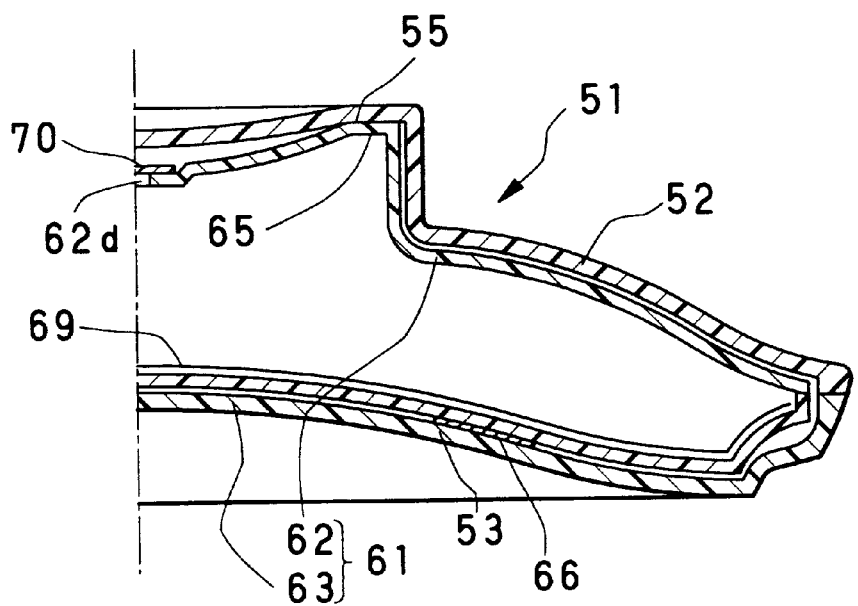
FIG. 14 is a primary portion cross sectional diagram illustrating a modified example of the thermally insulated lid according to the first embodiment.

FIG. 14 illustrates a modified example according to the above first embodiment of the thermally insulated lid. This example disposes an elastic body 66 made of silicon type rubber, urethane type rubber, and such in between the bottom surface wall 53 and the thermally insulating layer body of the lid 61, instead of the contact protrusion 56. By disposing in between the space formed by the bottom surface wall 53 and the thermally insulating layer body of the lid 61, one or more of these elastic bodies 66 having a thickness greater than the above space, it is possible to suppress the rattling of the thermally insulating layer body of the lid 61 within the space 54. The elastic body 66 is suitable for preventing the rattling of the thermally insulating layer body of the lid 61, because it elastically deforms between the bottom surface wall 53 and the bottom wall body 63, and because it has frictional force.

Figure 15:
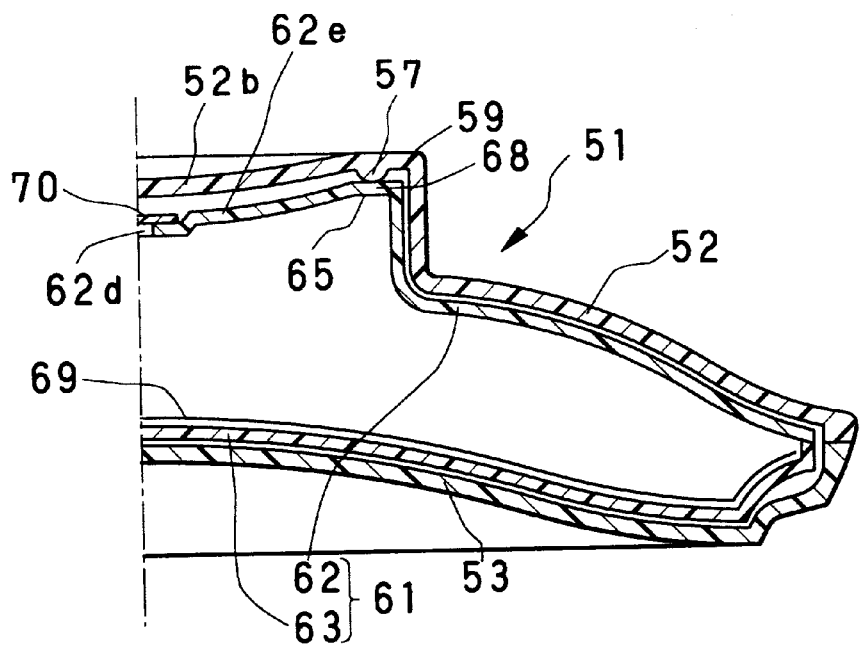
FIG. 15 is a primary portion cross sectional diagram illustrating the second embodiment of a thermally insulated synthetic resin lid of the present invention.

FIG. 15 illustrates the second embodiment of the thermally insulated synthetic resin lid of the present invention. This embodiment provides on the inner surface of the peripheral portion 59 of the canopy portion 52b provided on the top surface wall 52, a protrusion 57 which presses against the flat surface portion 65 on the outer surface of the peripheral portion 68 of the canopy portion 62e provided on the top wall body 62. This flat surface portion 65 may be a horizontal surface being parallel to the surface on which the thermally insulated lid 51 is turned upside down and correctly placed or can be slightly inclined.

It is possible to determine the vertical positioning of the thermally insulating layer body of the lid 61 with respect to the top surface wall 52 by forming the flat surface portion 65 on the thermally insulating layer body of the lid 61 and by forming the protrusion 57 on the inner surface of the canopy portion 52b of the top surface wall 52.

This protrusion 57 may be formed on the inner surface of the peripheral portion 59 of the canopy portion 52b of the top surface wall 52 in the shape of annularly protruding concentric circles starting from the center of the canopy portion 52b, or in the shape of a broken string of islands, or in the shape of dots. By forming the protrusion 57 to press against the thermally insulating layer body of the lid 61, the bottom surface of the bottom wall body 63 of the thermally insulating layer body of the lid 61 contacts the top surface of the bottom surface wall 53, thereby preventing the rattling of the thermally insulating layer body of the lid 61.

Figure 16:
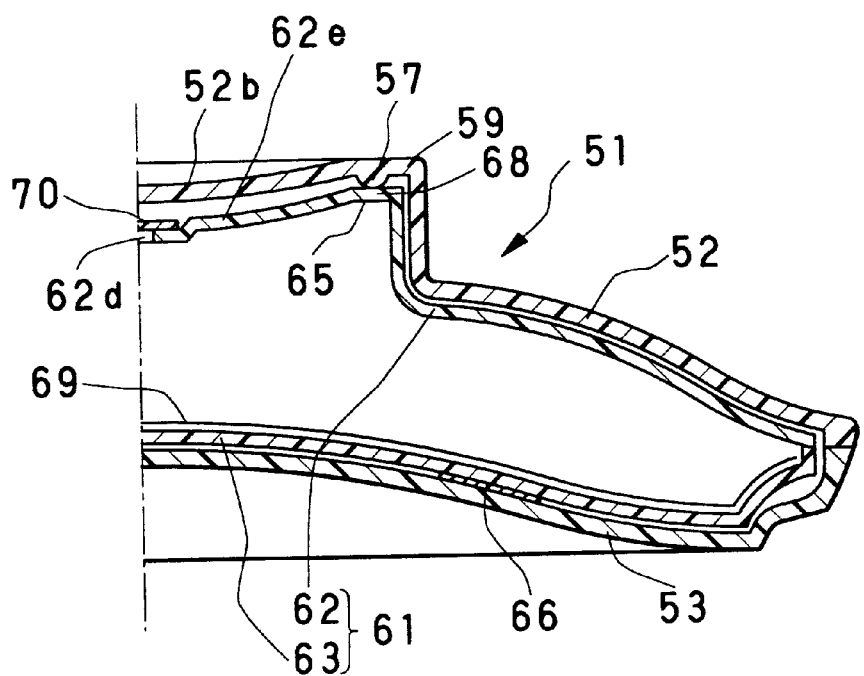
FIG. 16 is a primary portion cross sectional diagram illustrating a modified example of the thermally insulated lid according to the second embodiment.

FIG. 16 illustrates a modified example of the thermally insulated lid according to the above second embodiment. This example disposes in between the bottom surface wall 53 and the thermally insulating layer body of the lid 61, an elastic body 66 made of silicon type rubber, urethane type rubber, and such according to the second embodiment of the thermally insulated lid illustrated in FIG. 15. By disposing the elastic body 66 in between the bottom surface wall 53 and the thermally insulating layer body of the lid 61 as such, the rattling of the thermally insulating layer body of the lid 61 can be prevented more surely, and it is possible to have the top surface of the bottom surface wall 53 not directly contact the bottom surface of the bottom wall body 63. Consequently, the heat transfer loss due to thermal conduction from the bottom surface wall 53 to the bottom wall body 63 can be reduced.

In addition, if a protrusion is formed on the top surface of the bottom surface wall or the bottom surface of the bottom wall body instead of the elastic body 66, as in the case where the elastic body 66 is disposed in between the bottom surface wall 53 and the thermally insulating layer body of the lid 61, it is possible to reduce the heat transfer loss due to thermal conduction from the bottom surface wall 53 to the bottom wall body 63. Additionally, by the forming of this protrusion, it is possible to have the protrusion 57 of the top surface wall 52 push against the flat surface portion 65 of the thermally insulating layer body of the lid 61, thereby preventing the rattling of the thermally insulating layer body of the lid 61 more surely.

Figure 17:
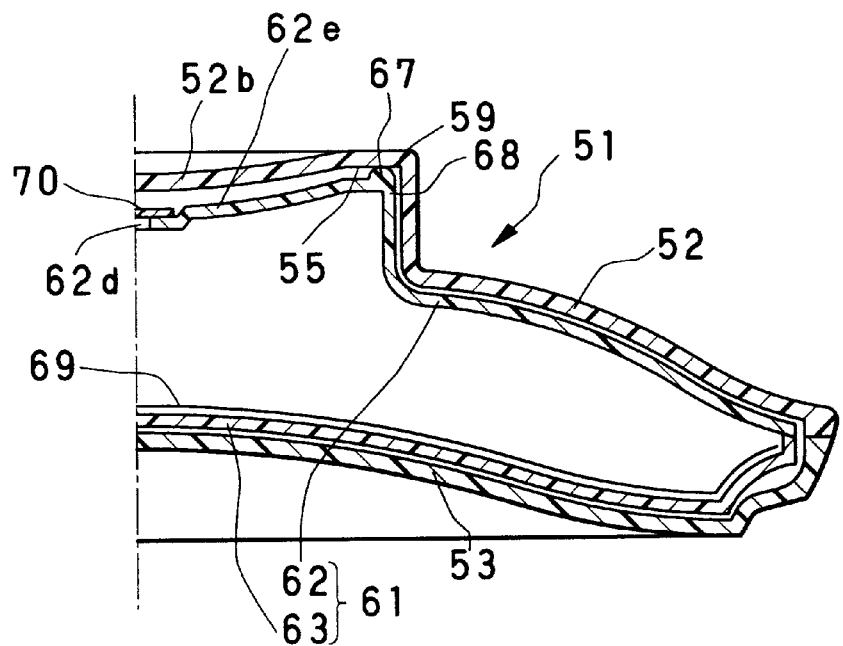
FIG. 17 is a primary portion cross sectional diagram illustrating the third embodiment of a thermally insulated synthetic resin lid of the present invention.

FIG. 17 illustrates the third embodiment of the thermally insulated synthetic resin lid of the present invention. This embodiment forms a flat surface portion 55 on the inner surface of the peripheral portion 59 of the canopy portion 52b provided on the top surface wall 52, and forms a protrusion 67 on the outer surface of the peripheral portion 68 of the canopy portion 62e provided on the thermally insulating layer body of the lid 61.

By forming a flat surface portion 55 on the inner surface of the canopy portion 52b of the top surface wall, and by forming a protrusion 67 on the thermally insulating layer body of the lid 61, it is possible to determine the vertical positioning of the thermally insulating layer body of the lid 61 with respect to the top surface wall 52.

This protrusion 67 may be formed on the outer surface of the peripheral portion 68 of the canopy portion 62e of the top wall body in the shape of annularly protruding concentric circles starting from the center of the canopy portion 62e, or in the shape of a broken string of islands, or in the shape of dots. By forming the protrusion 67 on the thermally insulating layer body of the lid 61 to contact the flat surface portion 55 of the top surface wall 52 as such, the bottom surface of the bottom wall body 63 of the thermally insulating layer body of the lid 61 contacts the top surface of the bottom surface wall 53, thereby preventing the rattling of the thermally insulating layer body of the lid 61.

Figure 18:
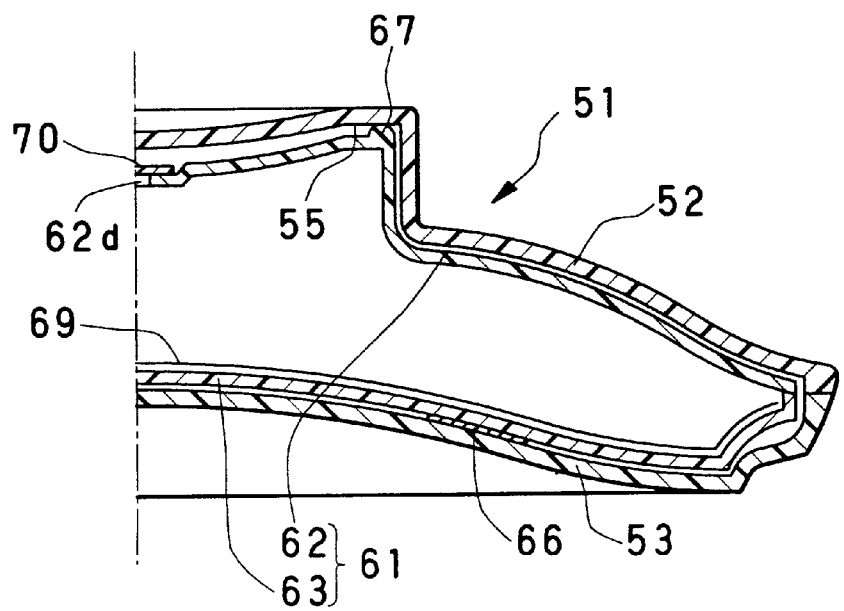
FIG. 18 is a primary portion cross sectional diagram illustrating a modified example of the thermally insulated lid according to the third embodiment.

FIG. 18 illustrates a modified example of the thermally insulated lid according to the above third embodiment. This example disposes in between the bottom surface wall 53 and the thermally insulating layer body of the lid 61, an elastic body 66 made of silicon type rubber, urethane type rubber, and such according to the third embodiment of the thermally insulated lid illustrated in FIG. 17. This example, as in the example illustrated by FIG. 16, gains advantages from the provision of the elastic body 66. In addition, it is possible to form a protrusion, instead of the elastic body 66, on the bottom surface of the bottom wall body or the top surface of the bottom surface wall to push against the thermally insulating layer body of the lid 61.

Figure 19:
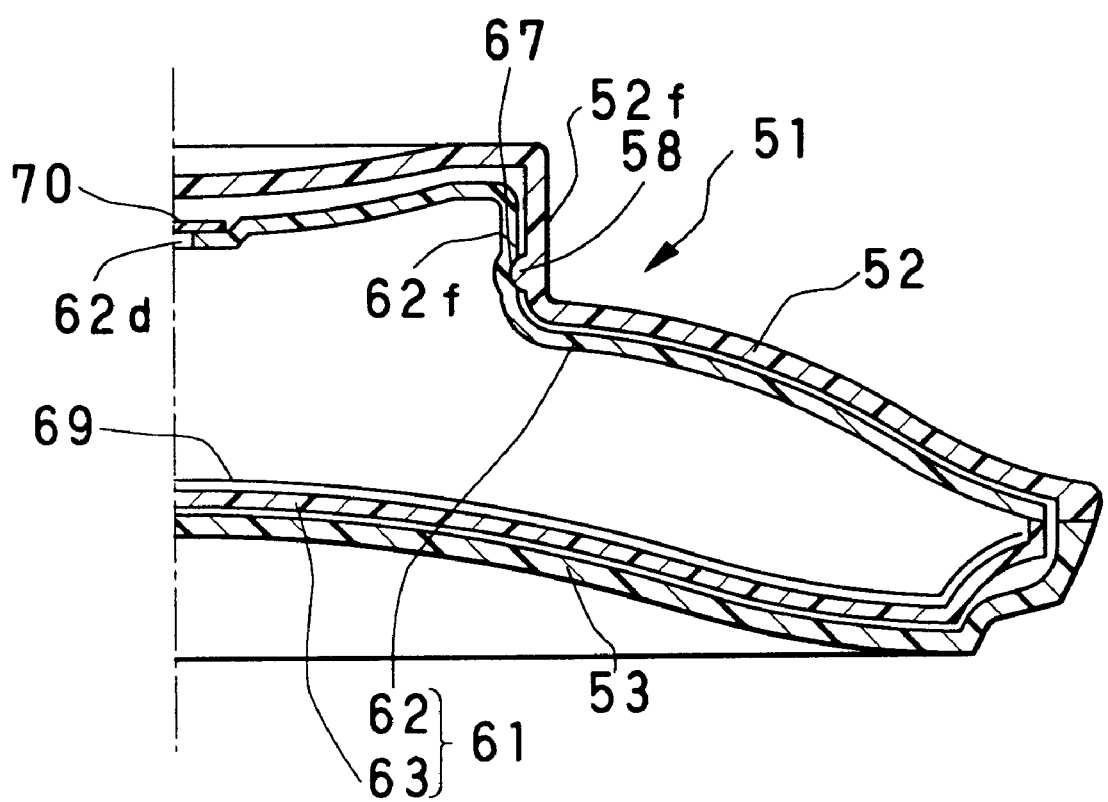
FIG. 19 is a primary portion cross sectional diagram illustrating the fourth embodiment of a thermally insulated synthetic resin lid of the present invention.

FIG. 19 illustrates the third embodiment of the thermally insulated synthetic resin lid of the present invention. This embodiment forms an annular protrusion 58 on the inner surface of the tubular protruding portion 52f of the inner surface wall 52, and forms on the outer surface of the tubular protruding portion 62f of the top wall body 62 of the thermally insulating layer body of the lid 61, an indented portion 67 to coercively engage with the above protrusion 58.

Since the indented portion 67 of the thermally insulating layer body of the lid 61 is coercively engaged with the protrusion 58 of the top surface wall 52 when the thermally insulating layer body of the lid 61 is placed in the top surface wall 52, the radial and the vertical positioning of the thermally insulating layer body of the lid 61 with respect to the top surface wall 52 is performed, and the rattling of the thermally insulating layer body of the lid 61 is prevented. In this case, if the vertical clearance between the top surface of the top wall body 62 and the bottom surface of the top surface wall 52 is eliminated, the rattling of the thermally insulating layer body of the lid 61 will be prevented more effectively.

In addition, the above embodiment may form an annul, protrusion on the outer surface of the tubular protruding portion 62f of the top wall body 62, and may provide an indented portion on the inner surface of the tubular protruding portion 52f of the top surface wall 52 to coercively engage with the above protrusion.

Furthermore, the radii of the tubular protruding portion 52f of the top surface wall 52 and the tubular protruding portion 62f of the top wall body 62 may decrease in the downward direction, and the tubular protruding portion 62f may be coercively engaged with the tubular protruding portion 52f.

What is claimed is:

1. A thermally insulated synthetic resin container comprising:
   a double wall container formed by joining an inner container made of synthetic resin and an outer container made of synthetic resin with a space provided in between said inner container and said outer container; and
   a separate thermally insulating layer body made of synthetic resin having a sealed double wall structure retained within the space between said inner container and said outer container; and gas having low thermal conductivity and having a thermal conductivity lower than that of air filled between the two walls of said sealed thermally insulating layer body; and a thermally insulating layer body supporting means on at least one of said double wall container and said thermally insulating layer body for preventing rattling of said thermally insulating layer body.

2. A thermally insulated synthetic resin container in accordance with claim 1, wherein said thermally insulating layer supporting means comprises a flat surface portion provided on the outer surface of the bottom portion of said thermally insulating layer body and a flat surface portion provided on the inner surface of the bottom portion of said outer container and positioned so that said flat surface portions contact each other.

3. A thermally insulated synthetic resin container in accordance with claim 1, wherein said thermally insulating layer body supporting means comprises a flat surface portion provided on one of the opposing surfaces of the outer surface of the bottom portion of said thermally insulating layer body or the inner surface of the bottom portion of said outer container, and a protrusion to contact said flat surface portion provided on the other opposing surface.

4. A thermally insulated synthetic resin container in accordance with claim 1, wherein said thermally insulating layer body supporting means comprises a vertical portion or an inclining portion, the radius of which gradually decreases in the upward direction, provided on either the bottom surface or side surface portion of said thermally insulating layer body and on either the bottom surface or side surface portion on the inner side of said outer container.

5. A thermally insulated synthetic resin container in accordance with claim 1, wherein said thermally insulating layer body supporting means comprises a protrusion provided on either the bottom portion or the corner portion of the outer surface of said inner container, with the protruding amount of said protrusion defined so that said protrusion contacts said thermally insulating layer body when said thermally insulating layer body is in said space between said inner and outer containers with said inner and outer containers joined to each other at the end portions thereof, and defined so that the amount of deformation of the contacting portion falls in the range of the elastic deformation of said thermally insulating layer body.

6. A thermally insulated synthetic resin container in accordance with claim 1, wherein said thermally insulating layer body supporting means comprises an elastic body disposed in between said double wall container and said thermally insulating layer body.

7. A thermally insulated synthetic resin lid comprising:
a double wall container formed by joining a top surface wall made of synthetic resin and a bottom surface wall made of synthetic resin with a space provided in between said top surface wall and said bottom surface wall; and
a separate sealed thermally insulating layer body of synthetic resin having a double wall structure;
a gas having low thermal conductivity and having a thermal conductivity lower than that of air in said sealed thermally insulating layer body;
said thermally insulating layer body is retained within the space between said top surface wall and said bottom surface wall of said lid; and a thermally insulating layer body supporting means on at least one of said double wall lid and said thermally insulating layer body for preventing the rattling of said thermally insulating layer body.

8. A thermally insulated synthetic resin lid in accordance with claim 7, wherein said thermally insulating layer body supporting means comprises a flat surface portion on the outer surface of a bottom portion of said thermally insulating layer body of the lid and a flat surface portion on the inner surface of the bottom portion of said bottom surface wall and positioned so that said flat surface portions contact each other.

9. A thermally insulated synthetic resin lid in accordance with claim 7, wherein said thermally insulating layer body supporting means of the lid comprises a flat surface portion provided on one of the opposing surfaces of the outer surface of the bottom portion of said thermally insulating layer body or the inner surface of the bottom portion of said bottom surface wall, and a protrusion to contact said flat surface portion provided on the other opposing surface.

10. A thermally insulated synthetic resin lid in accordance with claim 7, wherein said thermally insulating layer body supporting means of the lid comprises a vertical portion or an inclined portion, the radius of which increases in the upward direction, provided on either the bottom surface or side surface portion of said thermally insulating layer body of the lid and on either the bottom surface or side surface portion on the inner side of said bottom surface wall.

11. A thermally insulated synthetic resin lid in accordance with claim 7, wherein said thermally insulating layer body supporting means of the lid comprises a protrusion provided on at least one of the surface of said top surface wall and the top surface of said bottom surface wall, with the protruding amount of said protrusion defined so that said protrusion contacts said thermally insulating layer body of the lid when said thermally insulating layer body of the lid is in between said top and bottom surface walls with said top and bottom surface walls joined to each other at the end portions thereof, and defined so that the amount of deformation of the contacting portion falls in the range of the elastic deformation of said thermally insulating layer body.

12. A thermally insulated synthetic resin lid in accordance with claim 7, wherein said thermally insulating layer body supporting means of the lid comprises an elastic body disposed in between said double wall lid and said thermally insulating layer body of the lid.

13. A thermally insulated synthetic resin lid in accordance with claim 7, wherein said thermally insulating layer body supporting means of the lid comprises a flat surface portion provided on the outer surface of said thermally insulating layer body of the lid and a flat surface portion provided on the inner surface of said upper surface wall, so that said flat surface portions contact each other.

14. A thermally insulated synthetic resin lid in accordance with claim 7, wherein said thermally insulating layer body supporting means of the lid comprises a flat surface portion provided on one of the opposing surfaces of the outer surface of said thermally insulating layer body of the lid or the inner surface of said upper surface wall, and a protrusion to contact said flat surface portion provided on the other opposing surface.

15. A thermally insulated synthetic resin lid in accordance with claim 7, wherein said thermally insulating layer body supporting means of the lid comprises a protrusion portion provided on one of the opposing surfaces of the outer surface of said thermally insulating layer body of the lid or the inner surface of said upper surface wall, and an indented portion provided on the other opposing surface, so that said protrusion portion and said indented portion forcibly engage with each other.

* * * * *

UNITED STATES PATENT AND TRADEMARK OFFICE
CERTIFICATE OF CORRECTION

PATENT NO.    : 6,010,027
DATED         : January 4, 2000
INVENTOR(S)   : Takafumi Fujii et al.

It is certified that error appears in the above-identified patent and that said Letters Patent is hereby corrected as shown below:

Foremost page, [30], Foreign Application Priority Data, Please add

-March 7, 1996     [JP] JAPAN......................8-050547
April 16, 1996     [JP] JAPAN......................8-094521-.

Signed and Sealed this

Third Day of July, 2001

*Attest:*

NICHOLAS P. GODICI
*Attesting Officer*    *Acting Director of the United States Patent and Trademark Office*